(12) United States Patent  
Cameron

(10) Patent No.: US 9,438,029 B2  
(45) Date of Patent: Sep. 6, 2016

(54) CIRCUIT FOR TRANSFERRING POWER BETWEEN A DIRECT CURRENT LINE AND AN ALTERNATING-CURRENT LINE

(71) Applicant: D Kevin Cameron, Sunnyvale, CA (US)

(72) Inventor: D Kevin Cameron, Sunnyvale, CA (US)

(*) Notice: Subject to any disclaimer, the term of this patent is extended or adjusted under 35 U.S.C. 154(b) by 0 days.

(21) Appl. No.: 14/341,738

(22) Filed: Jul. 25, 2014

(65) Prior Publication Data

US 2014/0334202 A1    Nov. 13, 2014

Related U.S. Application Data

(63) Continuation of application No. PCT/US2013/023375, filed on Jan. 28, 2013.

(60) Provisional application No. 61/590,888, filed on Jan. 26, 2012.

(51) Int. Cl.  
*H02M 7/758* (2006.01)  
*H02M 7/797* (2006.01)  
*H02H 7/122* (2006.01)  
*H02J 5/00* (2016.01)  
*H02J 3/00* (2006.01)  
*H02M 7/539* (2006.01)

(52) U.S. Cl.  
CPC ............. *H02H 7/1222* (2013.01); *H02J 3/00* (2013.01); *H02J 5/00* (2013.01); *H02M 7/539* (2013.01); *Y10T 307/406* (2015.04)

(58) Field of Classification Search  
CPC ...... H02M 7/72; H02M 7/757; H02M 7/758; H02M 7/797

USPC ............. 363/84, 86, 87, 89, 95, 96, 97, 123, 363/127, 129, 131, 135  
See application file for complete search history.

(56) References Cited

U.S. PATENT DOCUMENTS

| | | | |
|---|---|---|---|
| 3,697,716 A | 10/1972 | Kornrumpf | |
| 5,559,685 A | 9/1996 | Lauw | |
| 6,163,471 A | 12/2000 | De Toledo | |
| 6,330,170 B1 | 12/2001 | Wang | |
| 7,719,864 B2 | 5/2010 | Kernahan et al. | |
| 7,884,500 B2 * | 2/2011 | Kernahan | 307/52 |
| 7,929,324 B1 | 4/2011 | Kernahan et al. | |
| 8,305,786 B2 * | 11/2012 | Kawasaki | 363/95 |

(Continued)

FOREIGN PATENT DOCUMENTS

| | | |
|---|---|---|
| CN | 102047557 A | 5/2011 |
| RU | 2089986 C1 | 9/1997 |
| RU | 2407130 C2 | 12/2010 |
| WO | 9016104 A1 | 12/1990 |
| WO | 96/24978 A1 | 8/1996 |
| WO | 2007042953 A2 | 4/2007 |

OTHER PUBLICATIONS

International Search Report for PCT/US2013/023375, related to BIP-102-US, ISA/RU, Apr. 11, 2013.  
International Preliminary Report on Patentability (IPRP) for PCT/US2013/023375, related to BIP-102-US, ISA/RU, Jul. 29, 2014.  
Extended European Search Report ("EESR") [supplementary European search report and the European search opinion], EPO for PCT/US2013/023375; mail date Oct. 12, 2015, 7pages.

*Primary Examiner* — Jeffrey Sterrett

(57) ABSTRACT

A system, method, and apparatus is disclosed for interfacing and transferring power unidirectionally or bidirectionally between a direct current (DC) line and a single or multiphase alternating-current (AC) line for only half of any given phase and only a single phase at a time when polarity is matched between the DC and the AC system. A circuit with simplified, robust, and reduced-cost components perform the power conditioning and the synchronization as a system that simulates a half-wave rectifier/inverter.

73 Claims, 12 Drawing Sheets

(56) References Cited

U.S. PATENT DOCUMENTS

| | | | |
|---|---|---|---|
| 8,482,156 B2* | 7/2013 | Spanoche et al. | 307/82 |
| 2007/0200521 A1* | 8/2007 | Ochiai et al. | 318/376 |
| 2008/0055940 A1* | 3/2008 | Lawson et al. | 363/16 |
| 2008/0252142 A1 | 10/2008 | Davies et al. | |
| 2012/0069613 A1* | 3/2012 | Nakagawa | 363/78 |
| 2014/0268959 A1* | 9/2014 | Frohman et al. | 363/98 |
| 2014/0334202 A1* | 11/2014 | Cameron | 363/56.01 |

* cited by examiner

CIRCUIT FOR TRANSFERRING POWER BETWEEN A DIRECT CURRENT LINE AND AN ALTERNATING-CURRENT LINE

CROSS-REFERENCE TO RELATED APPLICATIONS

This application is a continuation of, and claims priority to, PCT International Application No. PCT/US2013/023375, by D. Kevin Cameron, entitled "CIRCUIT FOR TRANSFERRING POWER BETWEEN A DIRECT CURRENT LINE AND AN ALTERNATING-CURRENT LINE," having an international filing date of Jan. 28, 2013; and also claims priority to provisional application U.S. Ser. No. 61/590,888 by D. Kevin Cameron, filed Jan. 26, 2012, entitled "CIRCUIT FOR TRANSFERRING POWER BETWEEN A DIRECT CURRENT LINE TO AN ALTERNATING-CURRENT LINE," which applications are also incorporated by reference herein, in their entirety. The above PCT International Application was published on May 2, 2013 in the English language as International Publication No. WO/2013/112981.

FIELD OF TECHNOLOGY

This disclosure relates generally to the technical fields of power electronics, and in one example embodiment, this disclosure relates to a method, apparatus and system of providing an interface to transfer power between a direct-current (DC) line and an alternating current (AC) line.

BACKGROUND

Alternative energy sources such as photovoltaic (PV) and wind power generation are becoming more commonplace in the global effort to conserve energy, move away from fossil fuels, become more self-reliant, and to reduce carbon footprints. Most alternative energy sources are intrinsically DC current sources. However, the modern commercial, industrial, and residential world runs almost entirely on AC current, including the power grid that distributes the power to consumers. Thus a grid-interactive inverter, or grid-tie inverter (GTI), is used to invert the DC current to an AC current. A significant cost element of the alternative energy solution is the GTI that converts the DC current supplied by the PV panels or wind turbine to AC current used by the utility power grid. As the price of PV panels falls, the inverter(s) will become a more significant fraction of the total lifecycle cost of the alternative energy system. Additionally, many PV systems operate at high voltages that subsequently require trained installers and maintenance workers familiar with the hazards of high voltage, thereby adding to the cost of the alternative energy system.

Some inverter designs use a transformer while others use no transformer (transformerless), and have a corresponding lower weight. High-frequency transformers follow an unconventional pattern of converting the DC into a high frequency AC, then back to DC, then finally to the desired line frequency AC. Transformerless inverters are less favored because of the possibility of transmitting DC faults directly into the AC grid, which could cause subsequent problems to the substation and the system at large.

Most inverters use maximum power point tracking (MPPT) that aligns the voltage and the current such that the product of the two, equal to the power, is maximized. Misalignment between the two could otherwise result in a high level of current being multiplied by a low voltage level, and vice versa, with the overall product resulting in a substantially reduced power output.

Residential electricity users in North America utilize a split single-phase AC line comprising a neutral line and two lines called phase and antiphase, which are sometimes inaccurately referred to as a two-phase line. The split single AC phase has a line voltage of 120 volts AC (VAC) root mean square (RMS) with an actual peak voltage of 170 volts (120 volts * √2) relative to neutral and a "peak-to-peak" voltage of 340 V. Traditional methodology involves converting the DC input source to drive the phase and antiphase lines via power semiconductor electronics that should be capable of withstanding the peak system voltage

SUMMARY

An apparatus, method, and system for interfacing, or transferring power between, a direct current line to an alternating-current utility grid is disclosed. Significant cost reduction and improved robustness is realized by driving only one polarity of an AC system at a time. With this method, components can be optimized for a polarity matching circuit (PMC), used to select an appropriate phase for the DC line, and a power conditioning circuit (PCC) coupled thereto, for controlling shape of the current on the DC line. Semiconductor devices for the power conditioning circuit, which operate at a high kHz frequency, can be rated for a low voltage rating of the AC peak voltage as they are only exposed to one polarity of an AC phase, rather than the full peak-to-peak AC voltage, e.g., only the half of the phase waveform with the same polarity rather than the full sinusoid waveform having both polarities. In comparison, semiconductor devices with more robust voltage ratings yet slower speeds can be used for the phase selector circuit that operate at a frequency not greater than an AC line, e.g., operates at the slower rate of 60 Hz. In one embodiment, the power conditioning circuit performs an inverter function to a split single-phase or to a multi-phase (2 or more phases) AC line to a utility grid as described. In another embodiment, the power conditioning circuit performs a rectifier function for either a split single-phase or a multi-phase AC line. The power conditioning can operate as a boost DC-DC converter to step up a DC voltage to an AC voltage level, or as a buck DC-DC converters to step down a DC voltage to an AC voltage level.

The PMC includes one or more solid state switches (SSSs) coupled to the DC line and a phase-selector. Each of the one or more switches is individually coupled to one respective phase of the one or more AC phases on the AC line. The phase-selector is configured to control the one or more switches such that no more than ONE SWITCH IS CLOSED when power is being transferred between the AC line and the DC line. The PMC functions to selectively couple via solid-state switches (SSSs) the DC line to one phase of the AC line that has a polarity that matches the polarity of the DC line. Only one phase is coupled to the DC line, e.g., no more than one switch coupling a phase to the DC line is closed when power is being transferred between the AC line and the DC line, to prevent a potential short-circuit. Thus, the PMC functions as a half-wave rectifier mode when the AC line powers the DC line and a half-wave inverter mode when the DC line powers the AC line. The phase selector is configured to couple each of the one or more switches selectively to the AC line such that no more than half of each phase, for all the one or more phases on the AC line, is communicated to the DC line. Regardless, current flows only in one direction through each of the one or more switches in the PMC for a given mode. The SSSs are chosen from a group of switches consisting of: a silicon-controlled rectifier (thyristor), a triac, a power field-effect transistor (FET), and an insulated gate bipolar transistor (IGBT). In general, N number of SSS is used in the PMC for N quantity of phases on the AC line. A phase selector is coupled to each of the one or more switches for controlling the switching function, and is coupled to the output of each of the one or more switches to monitor for an overvoltage condition that would cause the phase-selector to shut down, e.g., open, all of the one or more switches to prevent an over-voltage condition from failing the conditioning stage, and alternatively or additionally deactivating the PWM-controller to cease current generation in the PCC. The phase-selector opens a given switch of the one or more switches before a polarity of the AC phase to which the given switch is coupled changes to a polarity that is opposite of the polarity of the DC line. If the switch is an SCR or triac, then it is opened by either: turning off the PWM controller to stop driving current; shorting current to neutral via a shunt; by closing a second switch to another phase thereby reverse biasing and turning off a first switch that was previously closed; or by skipping a phase in a multi-phase system. Alternatively, if the switch is a power field-effect transistor (FET) then it can communicate current for both polarities of the AC current and can open while conducting current. For bidirectional current flow between the DC line and the AC line, the switch can be a FET or a pair of oppositely coupled SCRs coupled in parallel.

The PCC includes an input from a DC power source and a switching block coupled to the DC power source. The switching block includes: a pulse-width modulated (PWM) transistor coupled to, and controlled by, a pulse width modulated (PWM)-controller to obtain a desired current. The PCC can be configured as a buck converter if a voltage on the DC line exceeds a peak voltage of the AC line, or a boost converter if the peak voltage of the AC line exceeds a voltage on the DC line. The PWM transistor and controller operate at, below the peak AC voltage, or below the maximum DC voltage. A current generated by the PCC can either be shaped for delivering an optimum power factor (PF) to the AC system or can be shaped for delivering constant power (CP) to the AC system. The constant power mode is configured by drawing only a constant current from a DC source by measuring the current drawn via a current sensor on the DC line into the PCC. A constant voltage on the DC line is maintained by selectably coupling or shedding loads on the DC line. Based on conservation of energy, by outputting all the received power, the PCC provides a current profile that is inherently the inverse of the voltage level of the AC line to which the PCC is driving, thereby resulting in a product of the two, which is constant. In the alternative, the optimum power factor mode is obtained by shaping the current output from the PCC, as measured by a current sensor on the output of the PCC and fed back to the PWM controller for modifying the current as required to obtain the desired PF.

The system includes a DC power source coupled to the DC line, wherein the DC power source is chosen from a group consisting of: a photovoltaic (PV) DC power source, a wind-powered DC power source, and an alternative energy DC power source.

BRIEF DESCRIPTION OF THE VIEW OF DRAWINGS

Embodiments are illustrated by way of example and are not limited to the figures of the accompanying drawings, in which like references indicate similar elements and in which.

Other features of the present embodiments will be apparent from the accompanying drawings and from the detailed description that follows.

DETAILED DESCRIPTION

A method, apparatus and system for transferring power between a near constant, or approximately constant, voltage direct current (DC) power source to an alternating-current utility grid is disclosed. In the following description, for the purposes of explanation, numerous specific details are set forth in order to provide a thorough understanding of the various embodiments. It will be evident, however to one skilled in the art that various embodiments may be practiced without these specific details.

Functional Block Diagram

Figure 1A:
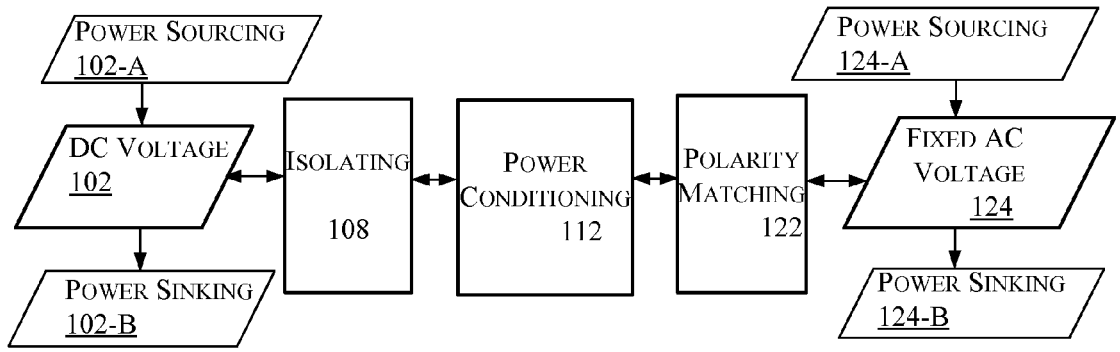
FIG. 1A is a functional diagram of a bidirectional system for transferring power between a direct current line and an alternating current line, according to one or more embodiments.

Referring now to FIG. 1A, a functional diagram of a bidirectional system 100-A for transferring power between a direct current (DC) line and an alternating current (AC) line is shown, according to one or more embodiments. A DC voltage (VDC) function 102 can be supplied by a power source 102-A, such as an alternative energy source. The power source 102-A can power components tied to it, e.g., power sinking function 102-B, and/or to power an AC line, e.g., a AC voltage power sinking function 124-B, such as a utility grid, for compensation such as energy credit. The voltage level of VDC 102 provided by an alternative energy source can be a fixed or variable level that provides power to an AC line and that powers other devices that can operate in a fixed and/or variable voltage level environment. Alternatively, VDC function 102 can be supplied primarily by power from the AC line 124, e.g., when the alternative energy source function 102-A is not available to provide power to the power sinking function 102-B. An optional isolating function block 108 processes the DC sourced power to prevent DC faults from propagating into the AC line, that otherwise might disturb the sensitive phase timing and/or the demand-response balance of the AC system. Power conditioning function 112 drives current unidirectionally, or optionally bidirectionally depending upon a system design, at a voltage level that is either boosted or bucked, depending upon the application and design specification of the VDC function 102 vis-à-vis the AC voltage (VAC) function 124. Polarity-matching function 122 only couples the VAC function 124 and the VDC function 102 when a polarity of both the VAC function 124 and the VDC function 102 is the same. In one embodiment, the polarity is a fixed polarity, e.g., either a positive polarity or negative polarity, but not both. Thus, system 100-A appears from the outside as a half-wave rectifier and/or half-wave inverter. The VAC 124 can be a power source 124-A, such as a functional utility grid, or fixed VAC 124 can be a power sink 124-B, such as a functional utility grid able to accept power, or a browned-out or blacked-out utility grid that needs power. Some of the many benefits of bidirectional system 100-A is that simpler, less expensive, and more robust electronic power components may be used to implement the power conditioning function 112 and the polarity-matching function 122 because power is only transferred between VAC function 124 and VDC function 102 when polarity of both functions is the same. The functions illustrated in FIG. 1A are implemented in structure, processes, systems, and their equivalents, as described in subsequent figures.

Figure 1B:
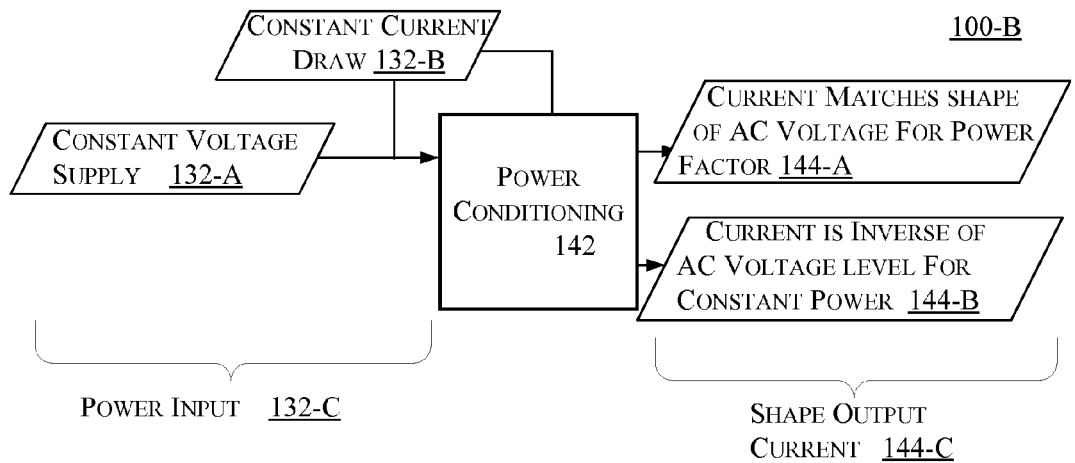
FIG. 1B is a functional diagram of a power-conditioning system having a constant power input from a direct current line and a resultant constant power output to an alternating current line or a resultant output current shaping, according to one or more embodiments.

Referring now to FIG. 1B a functional diagram of a power-conditioning system 100-B having a constant power input from a direct current line and a resultant constant power output to an alternating current line, or a resultant output current shaping, is shown, according to one or more embodiments. In particular, a constant voltage supply 132-A is provided, e.g., by power management of an alternative energy power source via selectable load coupling and shedding to maintain the constant voltage. One embodiment of such a circuit is provided in provisional patent application Ser. No. 61/489,263, filed May 24, 2011, entitled "System And Method For Integrating And Managing Demand/Response Between Alternative Energy Sources, Grid Power, And Loads," with common inventorship to the present disclosure, which application is hereby incorporated by reference in its entirety. Power conditioning block 142 has a function that draws a constant current 132-B in one embodiment, e.g., via current sensing, feedback and control capabilities therein. The resultant power input to power conditioning block 142 is the product of a constant input voltage supply 132-A times a constant input current draw 132-B, which results in a power input 132-C that is constant. On the output side, power condition block 142 provides a current shaping function 144-C as output 144-A that shapes current to match the shape of the AC voltage level so as to obtain a beneficial power factor (PF) or alternatively as output 144-B to shape current as an inverse of the AC voltage level for constant power. In the first case, an optimal power factor is typically required by an electrical utility grid to provide for cost-effective power transfer. The first case does not require a constant power into power conditioning block 142. In the latter case, the principle of conservation of energy dictates that if power-conditioning block 142 has a constant power input, with no shunting and negligible losses, then the function of supplying the maximum amount of current at any voltage level will result in a constant power output from the power-conditioning block 142. A constant power supply is a desirable property in a power source, especially if the recipient is a utility grid, which typically needs to maintain a balance between the demand and supply thereon. Moreover, drawing constant power from the DC line minimizes the ripple on the DC line and reduces the need for short-term storage normally performed by electrolytic capacitors, which tend to be failure prone.

System Schematic

Figure 2:
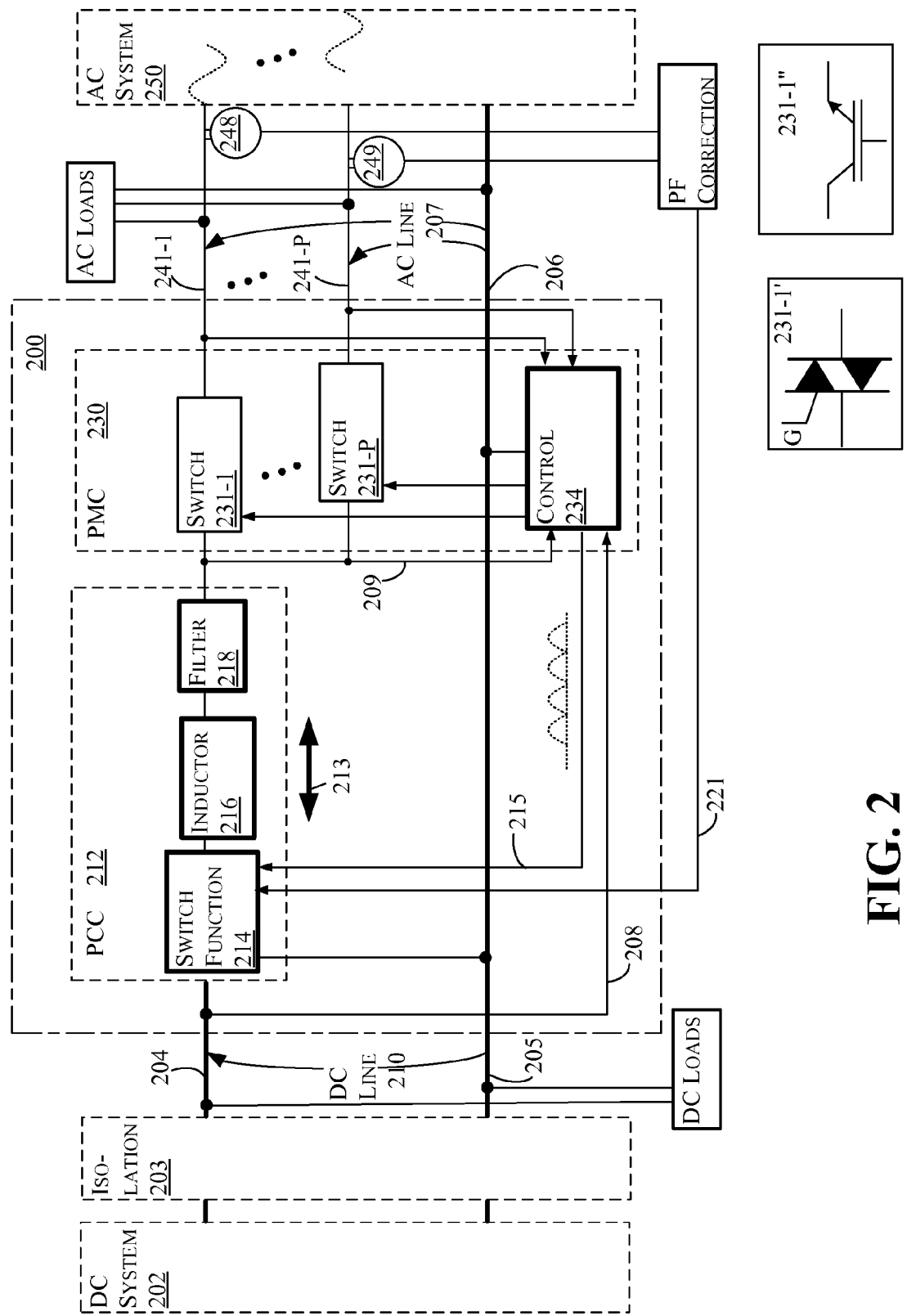
FIG. 2 is a block diagram of a system for bidirectionally transferring power between a DC line and an AC line, according to one or more embodiments.

Referring to FIG. 2, a block diagram of a system 200 for bidirectionally transferring power between a DC line and an AC line is shown, according to one or more embodiments. DC system 202, also referred to as a DC/AC interface, can be a DC alternative energy source that is uncontrolled, e.g., solar, wind, wave, etc. that provides DC power via a DC line 210 within system 200. The DC power source in this embodiment is specifically controlled to produce a near-constant voltage level, e.g., less than 2 volts in one embodiment and less than 5 volts variance in another embodiment, with an associated cut out voltage levels for both over-voltage and under-voltage conditions beyond a given narrow operating voltage band dictated by system performance needs and equipment and load sensitivities. Optional isolation block 203, as provided per wiring codes, receives power from the DC system and provides safety functions to prevent any potential DC faults from propagating to the AC line 207, and subsequently disrupting AC system 250, e.g., a utility grid. One embodiment of isolation block 203 is an H-bridge switched-mode DC-DC converter.

Power conditioning block 212, which couples optional isolation block 203 and polarity-matching block 230, drives current via a switching block 214 coupled to an inductor 216 and a subsequent filter 218, at a rate that creates a voltage level matching to that of the selected phase of the AC system 250. Switching block 214 is coupled to receive a sensed voltage level on the AC phases via voltage input 215, on the high side 204 and low side 205 of DC line 210, and on neutral 206 for feedback and control purposes. As known by those skilled in the art, power-conditioning circuit 212 can be either a boost or a buck circuit, or combination thereof. Inductor 216 can be configured to provide isolation functions as well, with a dual winding operating in a "flyback" mode, e.g., energy is transferred in on one winding and extracted on a second winding when the first is undriven. If PCC 212 and PMC 230 have circuit components and control logic for buck and boost conversion, and have switches that are bidirectional, then the system can be configured to provide a bidirectional current 213 via functioning as either a half-wave inverter or half-wave rectifier.

Polarity-matching circuit (PMC), or phase selector circuit, 230 has one or more switches, e.g., 231-1 through 231-P, where P≥2 when multiple switches are used, that are each controlled by control lines coupled thereto from control block 234. The quantity of switches is not greater than a quantity of phases supplied by the AC line in the present embodiment. Specifically, the control provided by control block 234 separately and selectively couples DC system 202, via DC line 210 and power conditioning block 212, to only one respective phase of one or more AC phases on AC system 250, via AC line 207, at a time when a polarity of both the DC line 210 and the AC line 207 are the same and such that no more than one of switches 231-1 to-231-P is closed at any given time, e.g., no more than one switch is fully closed when power is being transferred between the AC line and the DC line. That is, control block 234 will selectively close switch 231 to AC Phase I line 241-1 when a polarity of the AC phase I matches a polarity of DC line 210, and selectively close switch 231-P to AC phase P line 241-P when a polarity of AC phase P matches a polarity of DC line 210, so long as no more than one of switches 231-1 through 231-P are closed at any given time. Thus, switching speed for switches 231-1 through 231-P is that of the AC system, e.g., 60 Hz. Because the polarity of DC line 210 is constant, it is only when a polarity of a given phase matches the DC line that no more than one switch in the polarity-matching block 230 will fully close. Switches 231-1 through 231-P can alternatively be a triac, e.g., 231-1', or an insulated gate bipolar transistor (IGBT), e.g., 231-1".

Control block 234 is a phase selector that receives inputs from DC high side voltage level 204; neutral voltage 206; conditioned voltage level 209; and voltages from AC phase I 241-1 through AC phase P 241-P, where P≥2 for a multi-phase system. By having polarity-matching block 230 match the polarity between DC system 202 and AC system 250 the compatibility of power transfer between the two systems is ensured. By permitting no more than one switch in polarity matching block 230 to be fully closed at any given time, non-conflicting power transfer is ensured in system 200. Control block 234 senses the output voltage from switches 231-1 to 231-P, and if the output voltage exceeds a threshold, then control block 234 shuts down all of the one or more switches to protect the AC system 250.

In an alternative embodiment, more than one of switches 231-1 to-231-P can be closed at a time, providing that no more than one switch is forward biased at a time, e.g., all but one switch is either open or is reverse biased. This embodiment is accomplished by switching a following phase's SCR from an open to a closed state while a first SCR is already in a closed state for a first AC phase. The following phase's SCR steals current from the first SCR because the following phase has a lower potential than the phase to which the first SCR is coupled at the time it is closed. The polarity of the AC phases, respectively coupled to the first SCR and the second SCR, is the same as the phase of the DC line. The process of stealing current at a lower potential thus reverse biases the first SCR and effectively opens it, thus maintaining the condition that only one switch be fully closed to only transfer power between one phase and the DC line. The switching occurs prior to the voltage of the two phases crossing each other.

AC loads tapping into the AC line will alter the power factor of the AC power. By feeding back the current level 248, 249 sensed on the phases of the AC lines to a power factor (PF) correction circuit that provides a feedback 221 to the switch function block 214, the current output from PCC 212 can be adjusted to provide an optimal PF of the current supplied to AC system 250. In North American applications, the interface to AC line 207, e.g. the utility grid, is typically a local transformer that serves a modest quantity of houses. Such a transformer will effectively integrate current on AC phase I (1) line 241-1 and on AC phase P line 241-P, e.g., phase II (2) on line 242, to present power symmetrically to the AC grid. The topology of FIG. 2 can be simplified for use with a single-phase application by eliminating switch 231-P and AC Phase P. This configuration is referred to as a "single half-wave inverter." In a unidirectional system, e.g., one that transfers power only from DC line 210 to AC line 207, control block 234 determines whether conditioned voltage 209 falls below the peak phase-to-neutral grid voltage, in which case it will open switches 231-1 through 231-P and not attempt to transmit power to AC system 250.

Buck Mode 2-Phase Half-Wave Inverter Circuit

Figure 3A:
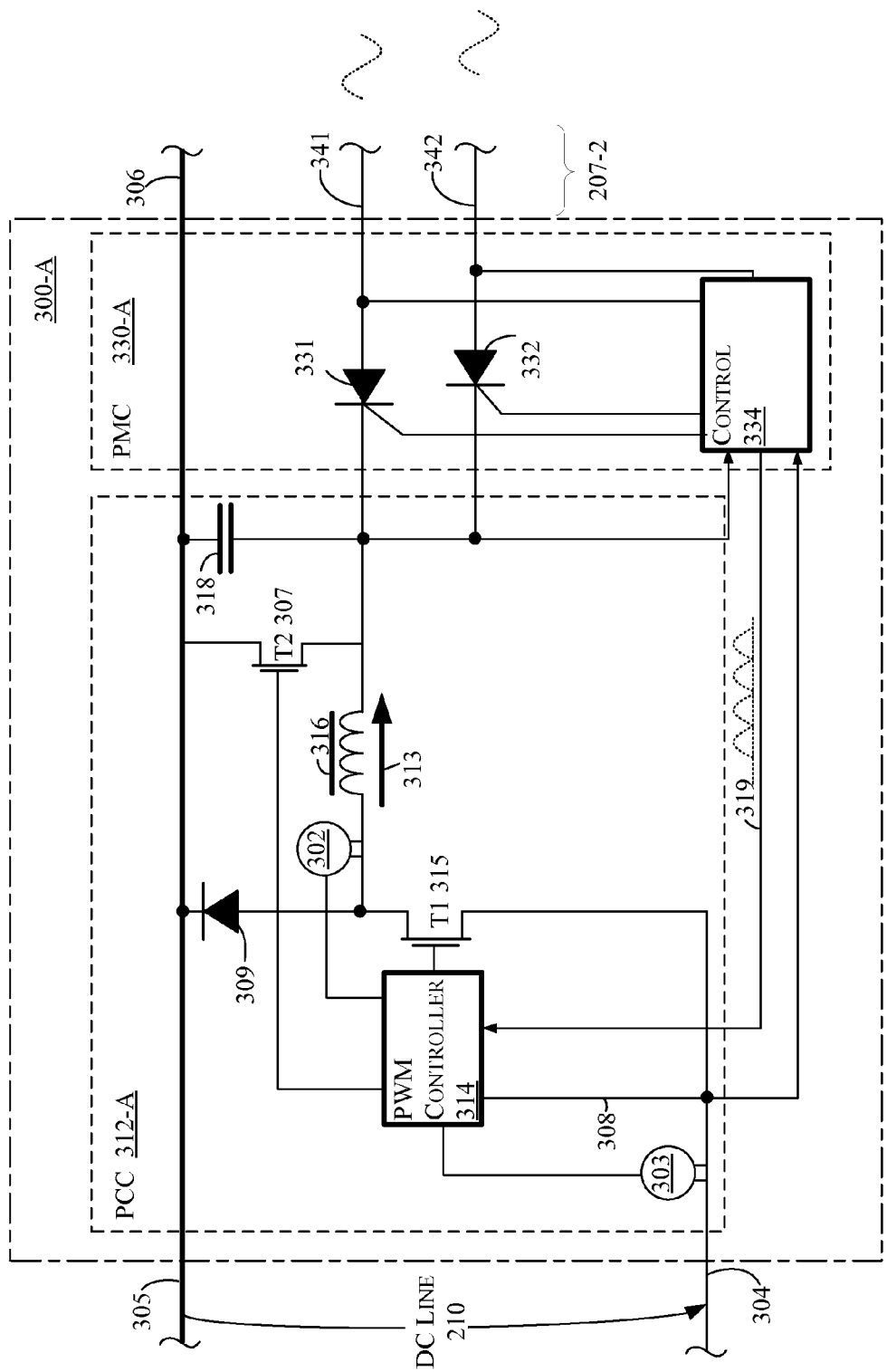
FIG. 3A is a schematic of a split single-phase AC system selectively coupled to a buck DC-DC converter for unidirectionally transferring power from a DC line to an AC line via solid-state switches with turnoff capability only at zero current, according to one or more embodiments.

Referring now to FIG. 3A, a schematic is shown of a split single-phase AC system selectively coupled to a buck DC-DC converter for unidirectionally transferring power from a DC line to an AC line via solid-state switches with turnoff capability only at zero current, according to one or more embodiments. System 300-A includes power conditioning circuit (PCC) 312-A having a pulse-width modulated (PWM) controller 314 coupled to T1 switching transistor 315 to control its duty cycle, and to flyback diode 309, of together implement switching block function block 214 of FIG. 2. PWM controller 314 receives current measurement input from DC line 210, to which is coupled, via current (I) sensing device 303 to determine whether DC line 210 is being pulled down by excessive current draw from power conditioning block 312-A. PWM controller 314 also receives current measurement input from current (I) sensing device 302 for sensing actual duty cycle performance of switching transistor T1 315 as indicated by unidirectional current flow 313 to inductor 316. Current sensor 302 and 303 may be implemented using any type of conventional current sensor, such as a resistive drop measurement of current, e.g., across an access transistor, or as an inductive measurement of current, or any device or method that provides reasonably accurate current measurements. A DC input 308 from low side 304 (−190 V DC) of DC line 210 is communicated to PWM controller 314 in order to detect performance of DC system. For example, a slight degradation of voltage sensed on line 308 can indicate a degradation of power-generating capability of DC system 202, and thus, current draw can be reduced by a predetermined performance curve, as embodied in a look up table describing the relationship between DC system 202 voltage versus current output.

Inductor 316 drives current because of its inherent property of maintaining a given current flow state, e.g., either current flowing or not flowing. Thus, when a closed and conducting switching transistor T1 315 is opened by controller 314 per the desired duty cycle, current flow to inductor 316 is interrupted, resulting in a collapse of the magnetic field in inductor windings 316. The collapsing magnetic field is naturally converted into current to help maintain the existing state of current flow through inductor 316, as known by those skilled in the art. When the magnetic field collapses in inductor 316, the voltage is reversed across inductor to maintain current flow, with diode 309 providing clamping against neutral line 306. Switching transistor T1 315 switches at a sufficient speed to operate the DC-DC converter function, e.g., a silicon power-FET working at a rate of 100 KHz or more in one embodiment. Alternative device materials could be GaN or SiC. However, power conditioning block 312-A is not exposed to the full range of AC voltage, as polarity-matching circuit 330-A only opens and exposes power conditioning block to half the voltage swing of a single AC phase at a time, and thus, electronic components in power conditioning block 312-A can be rated at a lower voltage, with potential cost savings and higher performance in other areas and more robustness.

In the present embodiment, power conditioning circuit 312-A is configured as a buck DC-DC converter to reduce voltage from DC line 210 of −190 VDC to AC line 207 peak voltage of 170 VAC (120 root mean square (RMS) voltage * √2). Filter block 218 of FIG. 2 is implemented in capacitor 318 that couples inductor 316 to neutral 306, in order to filter out high frequency noise arising from inductor 316.

Polarity-matching circuit 330-A, coupling power conditioning circuit (PCC) 312-A and AC line 207-2, implements polarity matching block 230 of FIG. 2. In particular, switches 231-1 through 231-P of FIG. 2 are implemented in the present embodiment using silicon-controlled rectifiers (SCR) 331 and 332 type of solid-state switches coupled to inductor 316 on the reverse biased side and individually coupled to respective AC phase I line 341 and AC phase II line 342 on the forward biased side. Switch controller 334, coupled similarly to control block 234 of FIG. 2, provides an input to each of switches 331 and 332 to individually and selectively open and close them. SCR switch 331 and 332 turn off, or open, only when current through the switch ceases. Thereafter SCR switch 331 or 332 must receive a control signal from switch controller 334 to turn back on, or close. Control block 334 provides an input 319 to PWM controller 314 to sense voltage on AC lines 341 and 342, e.g., for sensing overvoltage, and for sensing voltage of AC line for shaping of current 313 via PWM T1 315.

SCR switches 331-332 direct the filtered output of inductor 316 to the appropriate phase line 341 or 342 of the AC line 207-2, and turn off automatically at the end of the respective half cycle, that is, when the current through the switch falls to zero. Transistor T2 307 acts as a shunt circuit to draw current away from polarity-matching circuit 330-A in order to create a zero-current condition through the SCR and thereby forces SCR switches 331-332 to open at a a time period near phase crossover, e.g., from Phase I to Phase II and vice versa. The amount of current conducted through T2 307 shunt is normally small because the sinusoid is near zero current and zero voltage, yet provides a safety factor to prevent multiple phase from conducting through system 300-A at one time since it may work independently of the PWM controller 314 management of T1 315. In another embodiment configured for constant-power output for a multiphase version, e.g., in subsequent FIG. 4A, the shunt current may be higher, but the duration will be short, thereby resulting in only an acceptable amount of power loss.

Boost Mode 2-Phase Half-Wave Inverter Circuit

Figure 3B:
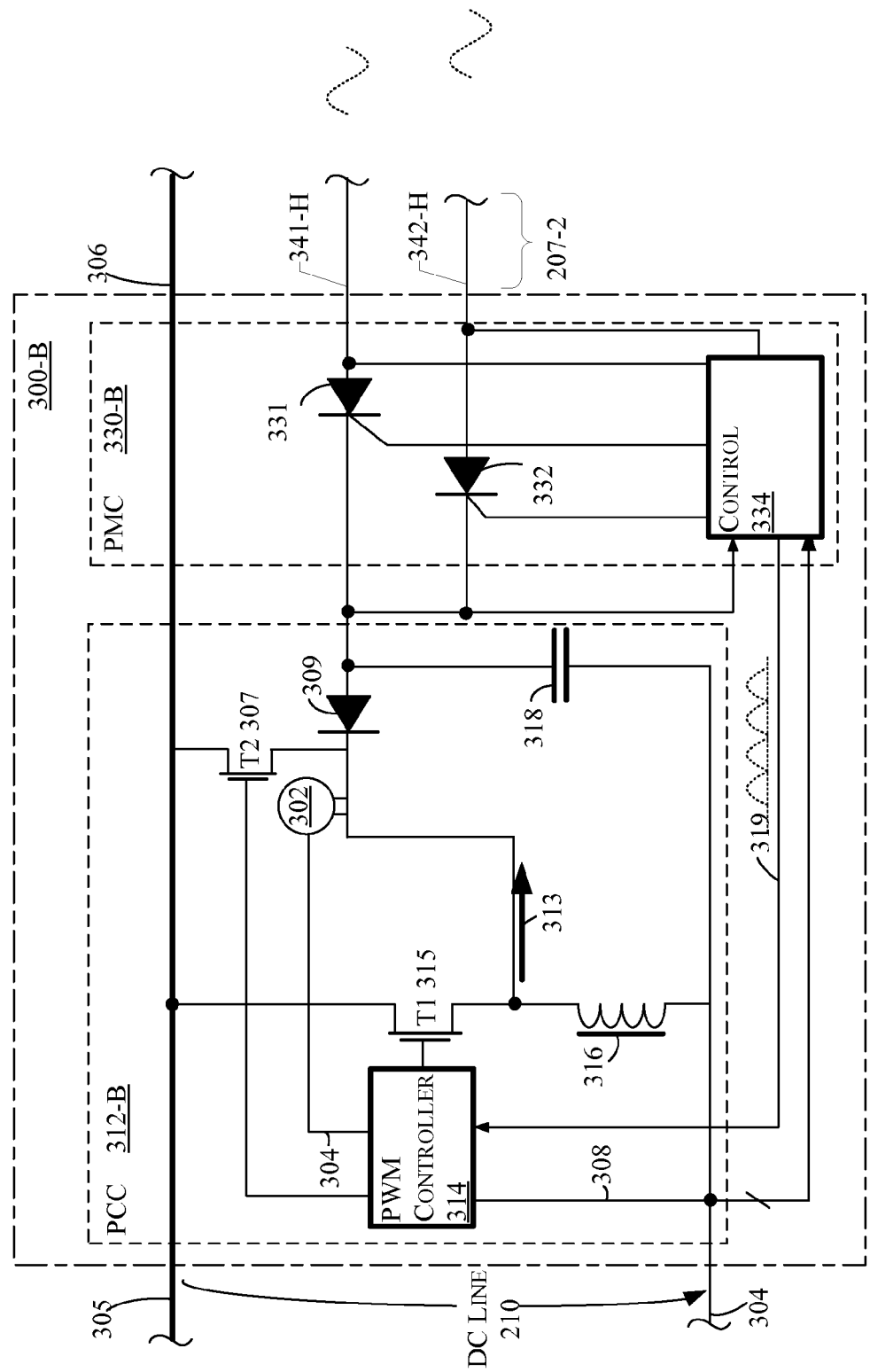
FIG. 3B is a schematic of a split single-phase AC system selectively coupled to a boost DC-DC converter for unidirectionally transferring power from a DC line to an AC line via solid-state switches with turnoff capability only at zero current, according to one or more embodiments.

Referring now to FIG. 3B, a schematic is shown of a split single-phase AC system selectively coupled to a boost DC-DC converter for unidirectionally transferring power from a DC line to an AC line via solid-state switches with turnoff capability only at zero current, according to one or more embodiments. System 300-B is configured similarly to system 300-A of FIG. 3A in terms of basic components and functions, e.g., capacitor 318, inductor 316, PWM controller 314, polarity-matching block 330-B, etc. However, because system 300-B utilizes a higher AC voltage split single-phase line 341-H and 342-H with a peak AC voltage that exceeds the voltage of 190 V on DC line 210, the power conditioning block 312-B now acts as a DC-DC boost circuit for unidirectional current 313 supplied from DC line 210 to AC line 207-2, rather than a buck circuit as used in FIG. 3A. That is, the PCC will boost the DC voltage from −190 V to a peak AC voltage of −360 V (−240 RMS *√2). In particular, flyback diode 309 is now coupled between polarity-matching circuit 330-B and both T1 switching transistor 315, coupled to the high side 305 of the DC line 210, and inductor 316, coupled to low side of the DC line 210. Capacitor 318 is coupled on the forward biased side of diode 309 down to the low voltage side of the DC line 210. Switch controller 334 and switching transistor T1 315, are coupled sensing inputs similar to system 300-A of FIG. 3A, but switch controller 314 now switches T1 to drive current at a boosted voltage level from DC line 210 to AC line 207-2.

In one embodiment, for either system 300-A or 300-B, diode 309 and/or solid-state switches 331 and 332 are replaced with transistors coupled to control block 334 to achieve greater power efficiency, albeit at slightly higher component cost. Additionally, while both FIGS. 3A and 3B illustrate two phases, e.g., a typical residential or commercial application, the present disclosure is well suited to running a single phase or multiple phases (e.g., 3 to 6 phases) of an AC line, for a very simple, low-cost, and robust circuit. In this embodiment, either one of switch 331 or 332 is not operated, or are not designed in the circuit, assuming the utility grid has sufficient robustness to accept an imbalanced feed of a single polarity of a single phase.

Figures 3C, 3D:
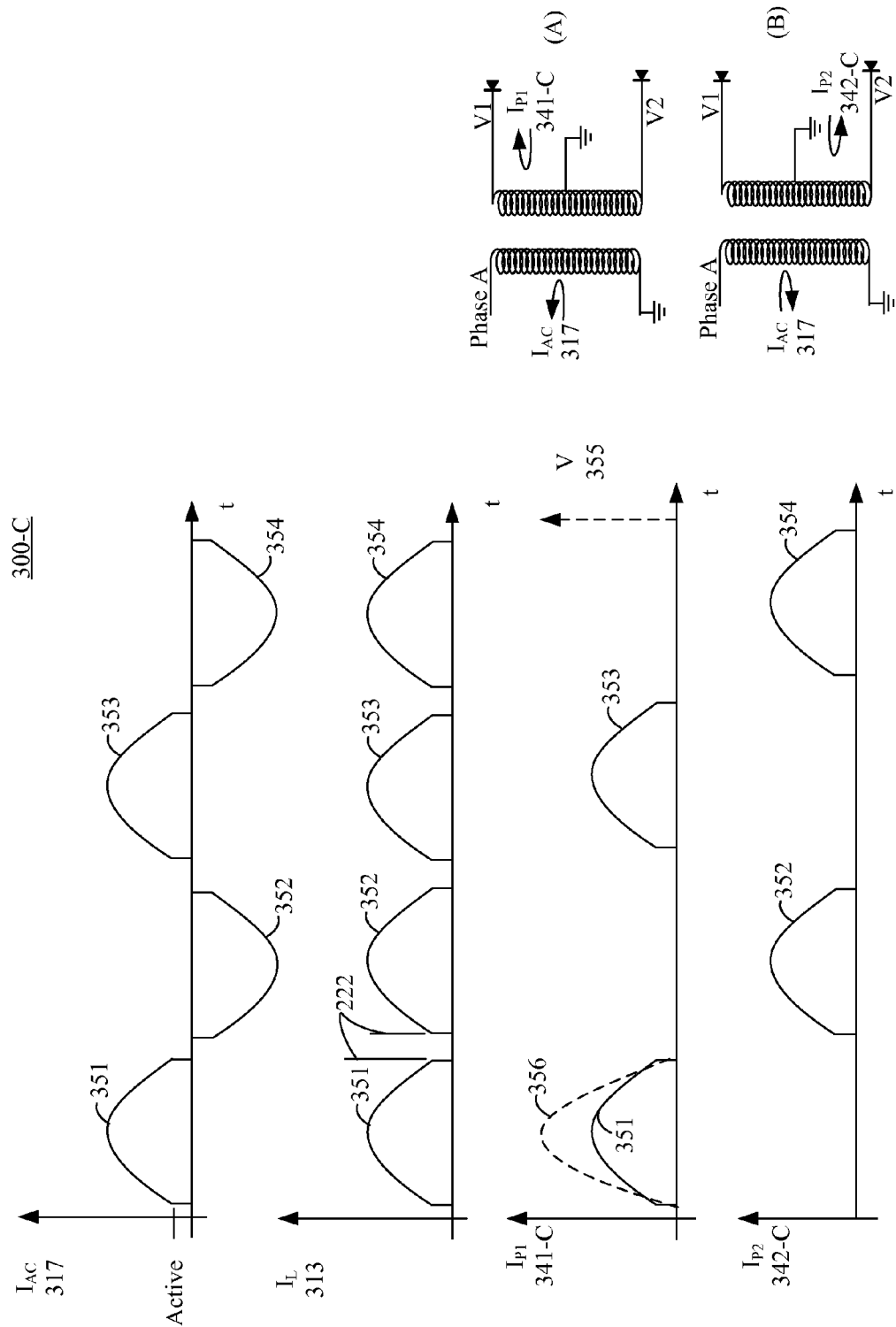
FIG. 3C is a timing diagram of current versus time for the power supplied from a DC line to a split single-phase AC line via solid-state switches with turnoff capability only at zero current, according to one or more embodiments.
FIG. 3D is a transformer illustrating how the half-wave inverter for a split single-phase produces a full wave on the utility grid, according to one or more embodiments.

Referring now to FIG. 3C, a timing diagram is shown of current (I) versus time (t) for the power supplied from a DC line to a split single-phase AC line via solid-state switches with turnoff capability only at zero current, according to one or more embodiments. Inductor current 313 is the composite non-continuous current from both AC phase I current ($I_{P1}$) 341-C and AC phase II current ($I_{P2}$) 342-C as the secondary current on the load side of the transformer to the AC system 250. All current flowing through inductor 316, and subsequently through polarity-matching block 330-A and 330-B will be only one polarity, e.g., traveling in a single direction. Hence, all current is shown on the top of the axis and none below, simulating a half-wave output. Power conditioning block 312-A or 312-B from FIGS. 3A or 3B shapes the current drawn from DC system 202 into a sinusoid shape as shown, to match the current profile of half of the full-wave AC system 250. The PMC 312-A and 312-B of FIG. 3A and FIG. 3B is configured to couple each of the one or more switches selectively to the AC line such that no more than half of each phase, or only one polarity of each phase, for all the one or more phases on the AC line, is communicated to the DC line. The phase-selector 334 of FIGS. 3A and 3B is configured to open a given switch of the one or more switches 331 to 332 before: a polarity of an AC phase to which the given switch is coupled changes to a polarity that is opposite of a polarity of the DC line; or before a zero voltage level is reached by the AC phase to which the given switch is coupled, as shown by current lobes 351 to 354 of FIG. 3C.

A switch cutoff gap 222 exists between the composite current flow through polarity-matching block 330-A and 330-B to prevent a condition where more than one phase will be conducting with power conditioning block 312-A or 312-B. A phase is only coupled to the DC line 210 after the phase voltage has reached an active voltage level, e.g., one in which the utility grid is safely established to be operating, such as 10-20 volts. This safety feature is to prevent powering a utility grid intended to be turned off for servicing by a technician. If transistors are used for switch 331, 332, then the switch cutoff gap 222 is accomplished by control block 334 turning off transistors 331, 332 and the cutoff gap 222 can be much narrower because a transistor can switch to an open state more accurately and with current flowing through the switch. However, if switches 331 and 332 are SCR switches, then current must be eliminated through the SCR in order for the SCR to open. Current can be eliminated through the SCR in numerous ways, such as: 1) eliminating current generation from the PCC by turning off the switching T 315; 2) by shunting current away from the SCR; 3) by reverse biasing the SCR by closing a second SCR at a lower potential, etc. such that the SCR will open automatically at zero current. Shunting can occur via a switch-controlled link, from T2 307 to neutral 306, as shown in FIG. 3A. Because only one phase is conducted at a time, voltage remains at a level commensurate with a single phase AC system, e.g., 110 V RMS, or 155 VAC peak, thereby allowing lower voltage-rated components to be used for power conditioning circuits, e.g., 312-A, 312-B.

Polarity-matching circuit 330-B, in turn, is responsible for directing the current to the appropriate polarity matched AC line 207-2. PWM controller 314 can sense voltage level of AC line 207-2, e.g., shown as exemplary voltage profile 356 and level 355, via voltage feed 310 from control block 334. In turn, PWM controller 314 senses current drawn from DC line 210 via current sensor 303 or from current pumped through inductor 316 via current sensor 302 that is accumulated over a longer period of time. For example, the sensed current can be accumulated over a period of time greater than the periodicity of a transistor T1 315 switching rate, e.g., 1/100 KHz, and less than the period of the current waveform itself, e.g., less than half of the AC period of 1/60 Hz. Thus, AC current lobe 351 is conducted through switch 331 because its polarity matches that of the DC line 210 at the noted time, while AC current lobe 352 is conducted through switch 332 because its polarity matches that of the DC line 210 at the subsequent noted time. A resultant AC current on the primary winding of a transformer, will receive the phase and antiphase of the split single phase as a sine wave, as shown with the appropriate polarity for the AC system. Gaps 222 can be smoothed out with inductive filtering devices on the AC line feed.

Referring now to FIG. 3D, a transformer is shown illustrating how the half-wave inverter for a split single-phase produces a full wave on the utility grid, according to one or more embodiments. Primary winding on the left coupled to phase A, which is a single phase of a typical three-phase utility grid, is transformed to secondary winding on the right with a split single phase having a center tap to ground, and V1 on the top line and V2 on the bottom line. In illustration (A) a top diode only allows current for $I_{P1}$ that drives a current $I_{AC}$ 317 in the polarity shown on phase A of the utility grid as current lobe 351. In illustration (B) by comparison, bottom diode only allows current for $I_{P2}$ that drives a current $I_{AC}$ 317 in the polarity shown on phase A of the utility grid as current lobe 352. Consequently, a full wave is driven onto AC utility grid.

Buck Mode 2-Phase Half-Wave Inverter Circuit with FETs

Figure 4A:
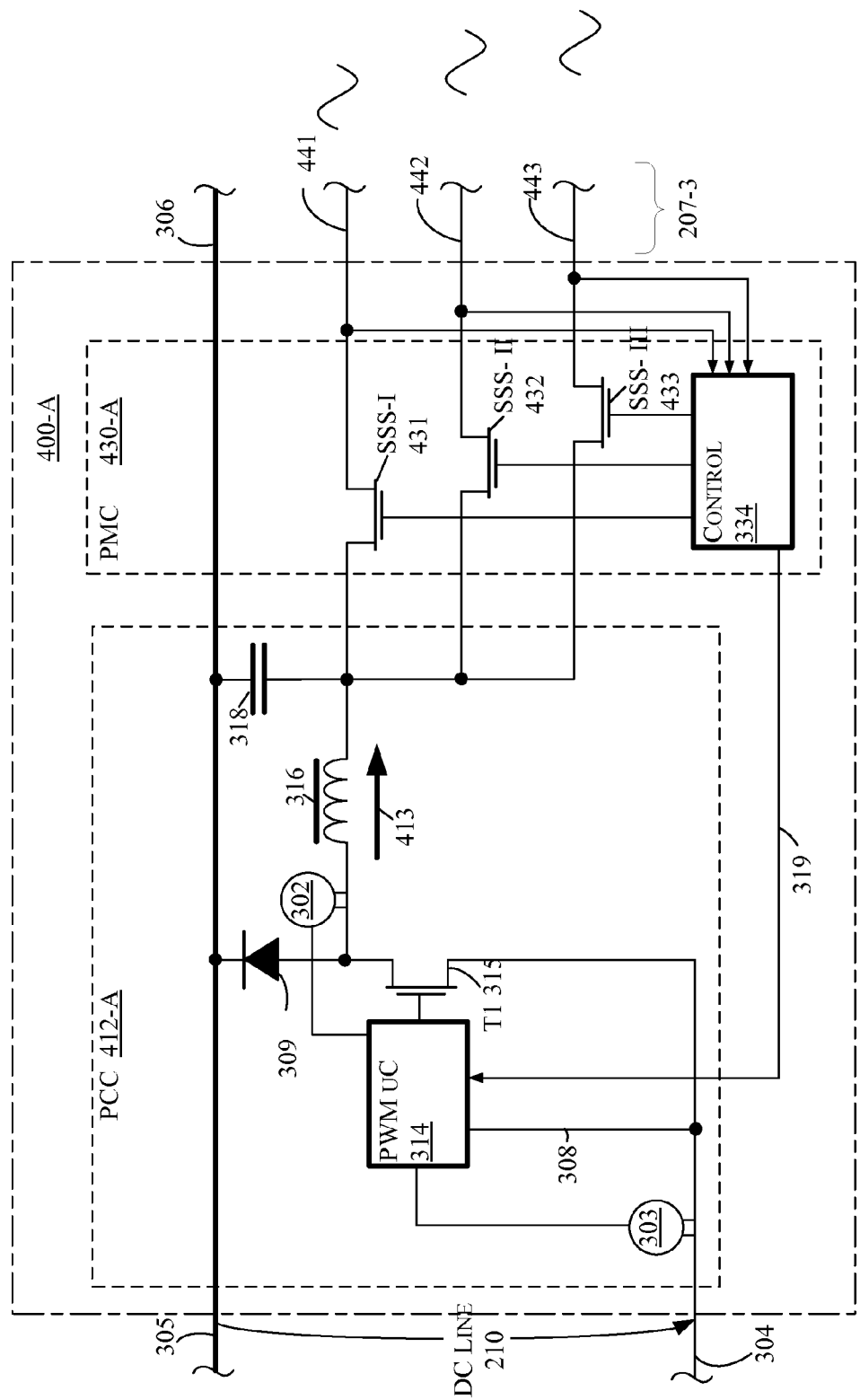
FIG. 4A is a schematic of a three-phase AC system selectively coupled to a buck DC-DC converter for unidirectionally transferring power from a DC line to an AC line via solid-state switches with turnoff capability while carrying current, according to one or more embodiments.

Referring now to FIG. 4A, a schematic is shown of a three-phase AC system selectively coupled to a buck DC-DC converter for unidirectionally transferring power from a DC line to an AC line via solid-state switches with turnoff capability while carrying current, according to one or more embodiments. System 400-A is configured similarly to system 300-A of FIG. 3B in terms of basic component properties and functions, e.g., capacitor 318, inductor 316, PWM controller 314, etc. Moreover, like FIG. 3B, present FIG. 4A operates a DC line 210 voltage at minus 350 volts, which is greater than the 155 VAC peak voltage. Thus to condition the current from the DC line 210 to the AC line 207-3, power conditioning block 412-A is configured and operated as a "buck" type DC-DC converter for unidirectional current 413.

Because system 400-A accommodates three phases, it uses three solid-state switches SSS-I 431, SSS-II 432, and SSS-III 433, in the polarity-matching circuit 430-A, to couple same-polarity current with the DC line 210 for each of the three phases to which they are independently and respectively coupled, AC phase I on AC phase line 441, AC phase II on AC phase line 442, and AC phase III on AC phase line 443. System 400-A implements solid state switches 431-433 as transistors, only needing a slow switching speed compatible with AC frequency, e.g., 60 Hz, such as power FET transistors or insulated gate bipolar transistors (IGBT), which achieve greater power efficiency than SCR type switches. The power FET transistors provide turn-off capability, as controlled by control block 334, to allow a sustained non-zero current flow across the three phases, as described in a subsequent timing diagram. Thus, system 400-A does not need a shunt circuit to redirect current away from polarity-matching circuit 430-A in order to turn-off current to SCR switches, which require zero current to open. While system 400-A is configured as a three-phase system, it may be selectively operated as a two-phase or a single-phase system, as programmed and controlled by control circuit 334 operating only the needed quantity of SSS in polarity-matching block 430-A.

Figure 4B:
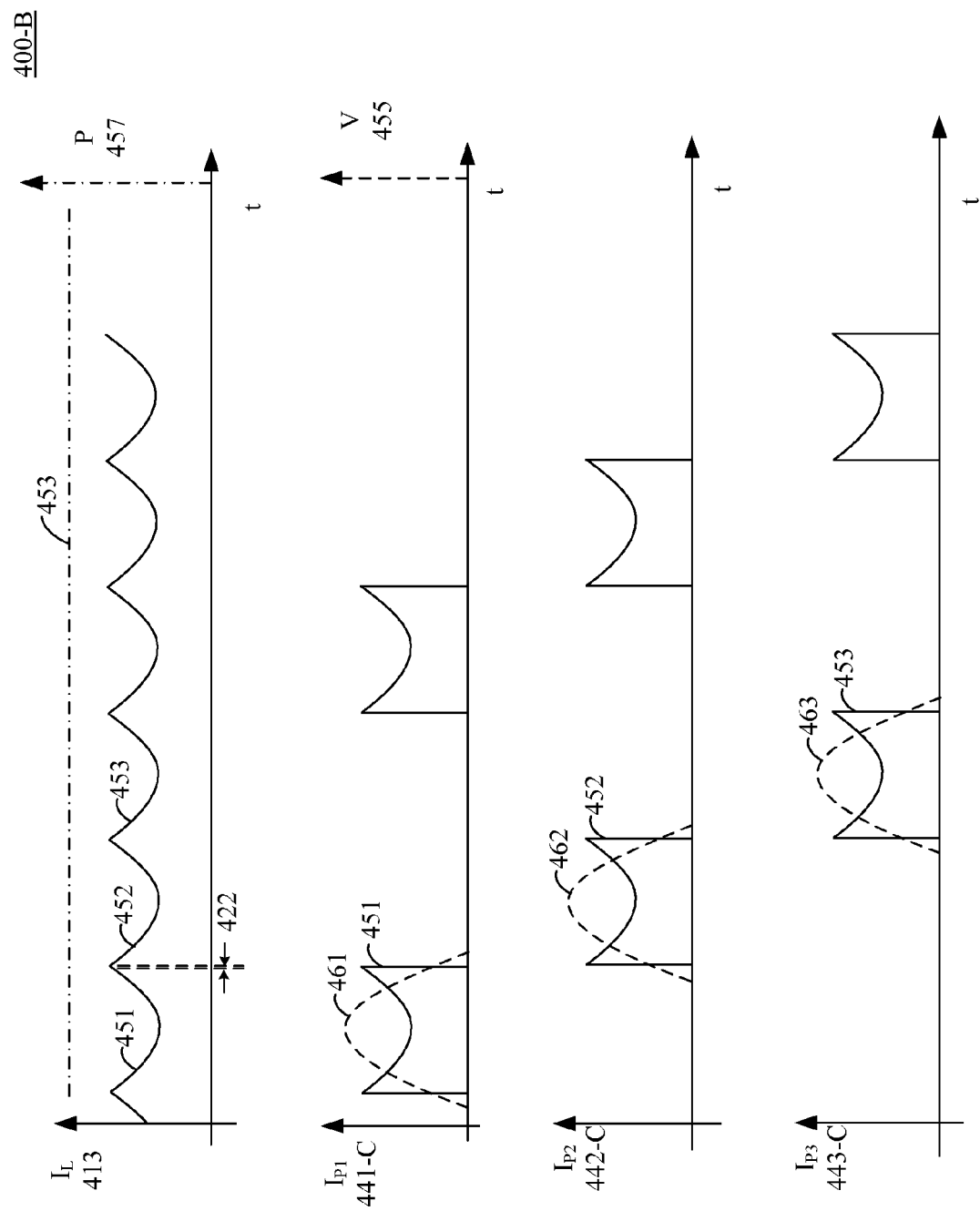
FIG. 4B is a timing diagram of current versus time for the power supplied from a DC line to each of three phases on an AC line via solid-state switches in constant power mode, according to one or more embodiments.

Referring now to FIG. 4B, a timing diagram is shown of current versus time for the power supplied from a DC line to each of three phases on an AC line via solid-state switches in constant power mode with turnoff capability while driving carrying current, according to one or more embodiments. Inductor current 413 is the composite current through inductor 316 from consecutive and contiguous AC phases of: phase I current (I) 441-C conducted through switch SSS-I 431, AC phase II current 442-C conducted through switch SSS-II 432, and AC phase III current 443-C conducted through SSS-III 433 of FIG. 4A, as controlled by control block 334 of polarity-matching block 430-A. All current flowing through inductor 316, and subsequently through polarity-matching block 330-A and 330-B will be only one polarity. Hence, all current is on the top of the axes and none is below, simulating a half-wave output across three-phases.

Power conditioning block 412-A from FIG. 4A shapes current drawn from DC system 202 into a current profile 451-453 that is an inverted sinusoid shape as shown, e.g., to approximately match an inverse shape of the voltage profile 460-463, respectively, of half of the AC sinusoid. In particular, current profile 451-453 times a sinusoid AC voltage 460, that exists on AC lines for AC Phase I 441 through AC Phase III 443 provides an approximately constant power output from power conditioning circuit 412-A of FIG. 4A, over time. Shaping of current profile 451-453 to achieve constant power output is provided by power conditioning circuit 412-A drawing only constant power from DC system 202 via DC line 210. Constant power draw from DC system 202 is ensured by PWM controller 314 that modulates switching transistor T1 315 to draw a constant current. Resultantly, the sensed DC line voltage input 308 times DC current draw input from current sensor 303, is maintained at a near constant value, e.g., a constant current drawn time its near-constant voltage equals a near constant power draw.

The DC power supply system 202 in the present embodiment is configured with power supply electronics that maintain its output voltage at a near constant level, regardless of its output current, in addition to a cutout for overvoltage and undervoltage conditions on its output. The constant voltage configuration is described in FIG. 1B. Other configurations of DC power supply systems 202 can be utilized with the present disclosure. Thus, the resulting output current from power-conditioning block 430-A of FIG. 2, naturally results in the current profile shown, considering conservation of power in vs. power out from the power-conditioning block 412-A. A cutoff gap 422 for switches exists between current flow from different phases, 451, 452, 453 into composite current flow 413 is implemented via control block 334 of polarity-matching block 430-A to prevent a condition where more than one phase will be conducting with power conditioning block 412-A. Because transistors 432-433 are used, the switch cutoff gap 422 is accomplished by control block 334, and the spacing of cutoff gap 422 can be minimized to reduce power loss and ensure a smoother power transfer to AC system across all phases.

Buck Mode 3-Phase Half-Wave Inverter Circuit with SCRs

Figure 4C:
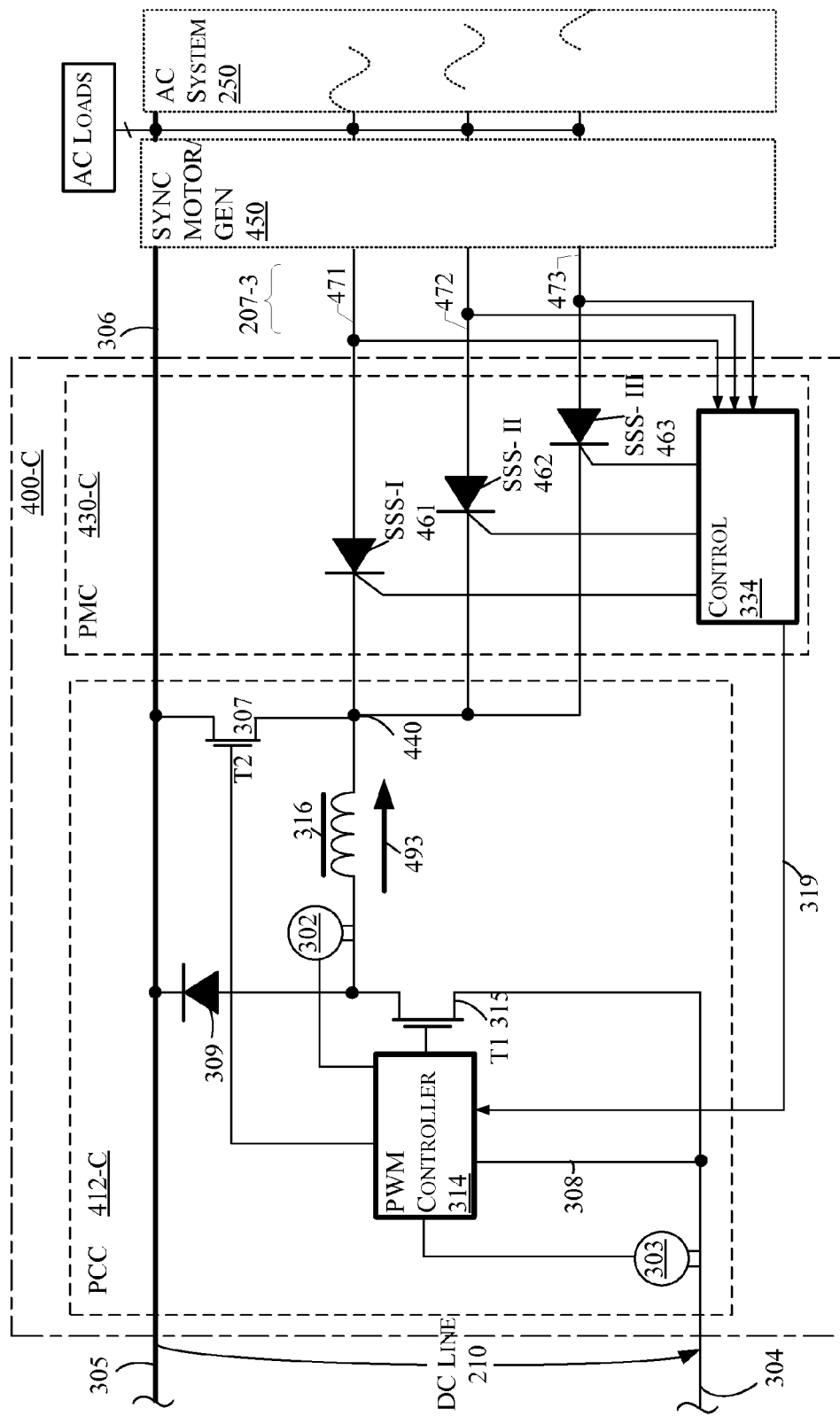
FIG. 4C is a schematic of a three-phase AC system selectively coupled to a buck DC-DC converter for unidirectionally transferring power from a DC line to an AC line via solid-state switches with turnoff capability only at zero current, according to one or more embodiments.

Referring now to FIG. 4C, a schematic is shown of a three-phase AC system selectively coupled to a buck DC-DC converter for unidirectionally transferring power from a DC line to an AC line via solid-state switches with turnoff capability only at zero current, according to one or more embodiments. FIG. 4C utilizes SCR type solid-state switches 461-463 for polarity-matching circuit 430-C that require zero current to switch off. Thus, power conditioning circuit 412-C provides a sufficient gap between adjacent phases to allow switches 461-463 to shut off. Alternatively, system 400-C can use a shunt, as exemplified by T2 transistor 307 of FIG. 3A, to redirect current from polarity-matching block 430-C at times where phases would have otherwise overlapped (not shown). Alternatively, the phases coupled to DC line 210 can be staggered such that there is a gap between phases conducting to the DC line 210, as illustrated in the subsequent timing diagram of FIG. 4D.

A mechanical energy storage device or generator 450, such as a rotary flywheel, is coupled in parallel to system 400-C and the AC loads and AC system 250, the utility grid. The inertial storage solves many potentially undesirable properties of the present half-wave inverter/rectifier architecture to provide a smoothing of the current and a damping of any voltage spikes and other noise caused in the system 400-C conditioning and switching power between the DC system 202 and the AC system 250. In the present embodiment, the storage device 450 is a synchronous motor/generator (SMG), which offers many advantages over costly and failure-prone alternative smoothing devices such as static electrolytic, batteries, and/or supercapacitors. An SMG 450 can operate reliably and maintenance free for decades as a high-speed mechanical flywheel with both motor and generator windings in a vacuum chamber.

SMG 450 may be connected in parallel with straight feed through from phase switches to the AC system to act as a UPS. Alternatively, SMG 450 can function as an isolation stage with extra functionality as a step-up or step-down voltage transformer. DC system 400-C drives current via lines 471, 472, and 473 into motor windings of SMG 450 while generator windings in SMG 450 are coupled out to AC system 250. Any changes in current and voltage are absorbed by the spinning inertia of the rotor in SMG 450, thereby providing the smoothing capacitive and inductive functions.

When the SMG 450 is combined with a DC system, e.g., the DC/AC interface, 400-C, the result is a balanced high power-factor feed from AC lines 270-3 to AC loads and to AC system 250. The SMG 450 has sufficient inertia to accept any type of power generated by DC/AC interface 400-C, such as constant power output configuration, PF corrected current shaping, skipped phases, etc. Multiple phases 431 to 433 and 471-473 can be driven by the DC/AC interfaces 400-A and 400-C, respectively, with either all phases (shown) or only one phase can be fed out from SMG 450 into AC loads or AC system 250, depending on the winding of the electrical generator portion of the SMG 450. The AC loads can be a local residential or commercial split single-phase or multiphase system that benefits from a clean AC cycle generated from the generator portion of the SMG 450 without power dead spots. Applications needing very reliable power and/or that have heavy AC loads, such as medical institutions, server farms, facilities with rotating equipment, etc., that can't easily be run off the DC system, benefit from the flywheel which can provide smooth power and provide high peak currents for motor starts. SMG 450 can be utilized in any of the architectures described herein.

If the AC system 250 is disconnected from the DC/AC interface 400-C, the power level generated from the DC/AC interface 400-C will be adjusted to maintain the AC voltage and the AC frequency output from the SMG 450. The output voltage from SMG 450 is fed back to PWM controller 314 for this control purpose.

Figure 4D:
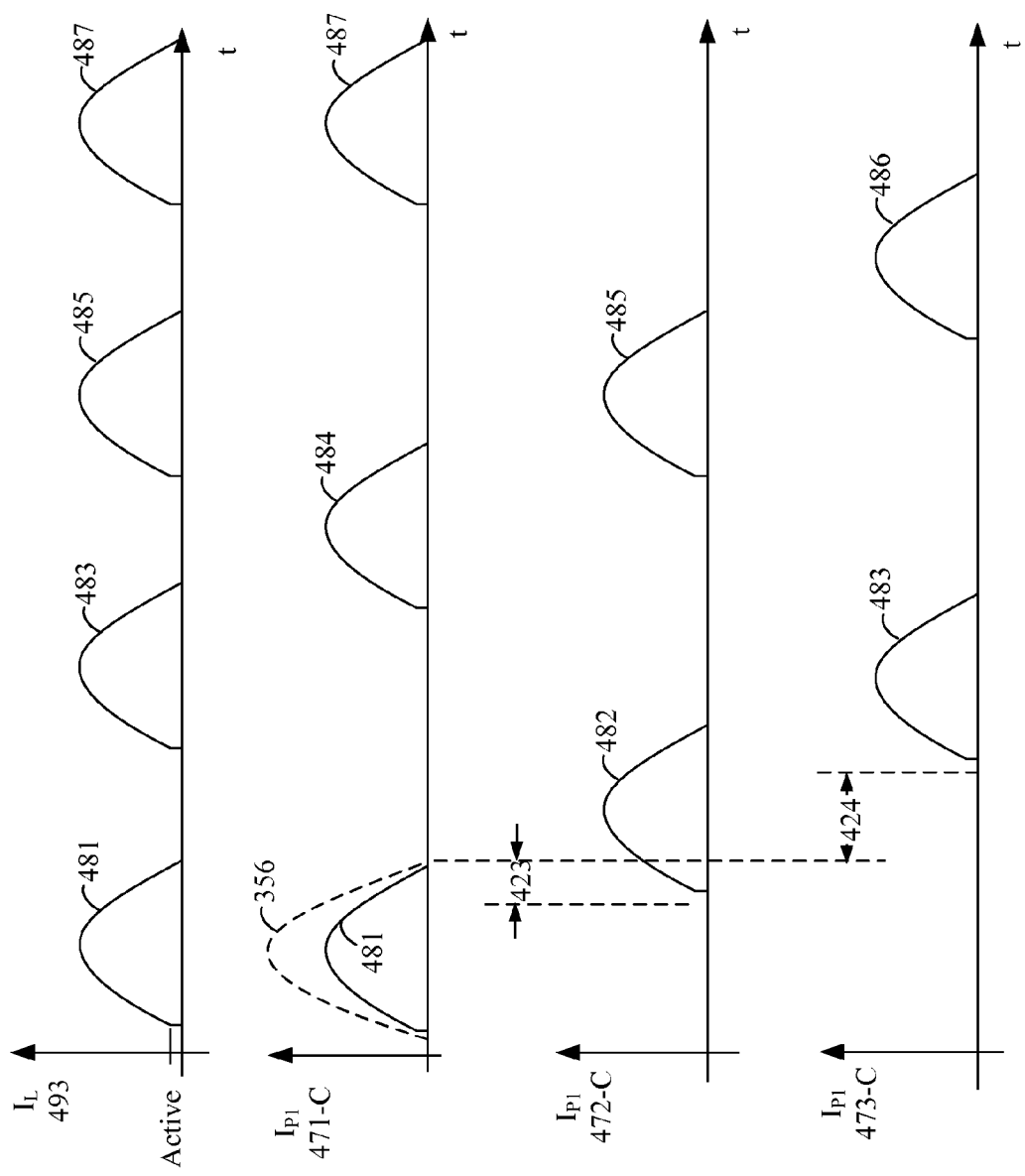
FIG. 4D is a timing diagram of current versus time for the power supplied from a DC line to each of three phases on an AC line in a staggered fashion while skipping some of the phases via solid-state switches with turnoff capability only at zero current, according to one or more embodiments.

Referring now to FIG. 4D, a timing diagram 400-D is shown of current versus time for the power supplied from a DC line to three phases on an AC line in a staggered fashion while skipping some of the phases via solid-state switches with turnoff capability only at zero current, according to one or more embodiments. FIG. 4D resembles timing diagram in FIG. 3C, because both timing diagrams use SCR type solid-state switches for polarity matching. Inductor current ($i_L$) 493 is the composite current from consecutive and non-contiguous AC phases of: AC phase I current (I) 471-I conducted through switch SSS-I 461, AC phase III current 473-I conducted through switch SSS-III 463, and AC phase II current 472-I conducted through switch SSS-II 462, in that order, as controlled by control block 334 of polarity-matching block 430-C, as shown in FIG. 4C.

Current flow 493 through inductor 316, and subsequently through polarity-matching block 430-C of FIG. 4C is only one polarity. Hence, all inductor current 493 is above the top of the axis and none is below the axis, thereby simulating a half-wave output across three-phases. Unlike inductor current 413 in timing diagram 400-B, Inductor current 493 in present diagram 400-D is not continuous. This is because adjacent phases in a three-phase system have an overlap 423, where the current and voltage are too high to efficiently shunt current, or the resulting current discontinuities are not tolerable to the AC line. Instead, polarity-matching block 430-C of system 400-C only communicates power between DC line 210 and AC line 207-3 at every other phase, thus allowing a sufficient non-conducting time gap 424 between phases, e.g., current lobe 481 from Phase I current 471-C and current lobe 483 from Phase III current 473-C, where switches in polarity-matching block 430-C can turn off. Consequently, current lobe 482 for Phase II current 472-C is not communicated to AC phase II line 472, and thus system 400-C does not communicate as much power as does system 400-A. However, components and operation of system 400-C are simpler than that of 400-A, providing a reasonable tradeoff to be chosen by a given application's needs.

The phases communicated between the DC system and the AC system, and the phases skipped, alternate in a round robin manner. Thus, for a three-phase system, the phases that receive power from the DC system (no brackets) and the phases skipped (in brackets) are: 1, [2], 3, [1], 2, [3], 1, [2], 3, [1], 2 . . . Consequently, over time, the power received by each phase in a split-single phase, or a multi-phase AC system is equal. More than one phase can be skipped as well, providing that it is not equal to one minus a total quantity of all the AC phases and is not a divisor to the total quantity of AC phases that would result in a whole number quotient. Thus, for a three-phase system, N=3, and skipping N−1 phases (2 phases) is not recommended, as only phase 1 will ever be powered, and phase 2 and 3 will always be skipped. Likewise, for a four-phase system, N=4, and skipping 2 phases (a divisor that result in a whole number quotient from the total number of phases) is not recommended, as only phase 1 and 4 will ever be powered, and phase 2 and 3 will always be skipped.

Power conditioning block 412-C of FIG. 4C can be configured to shape current drawn from DC system 202 into current profile 481-486 of FIG. 4D, similar to that described and shown for of timing diagram 300-C of FIG. 3C. Because three phases are used in timing diagram 400-D, the separation between every other phase, e.g., phase I and phase III, provides ample gap in current flow such that no clipping is necessary of any given phase being conducted through polarity-matching circuit 430-C, and thus no shunt circuit is required for the operation of the circuit in FIG. 4C, but it may be included for safety.

Bi-Directional Grid-Tie Inverter

Figure 5A:
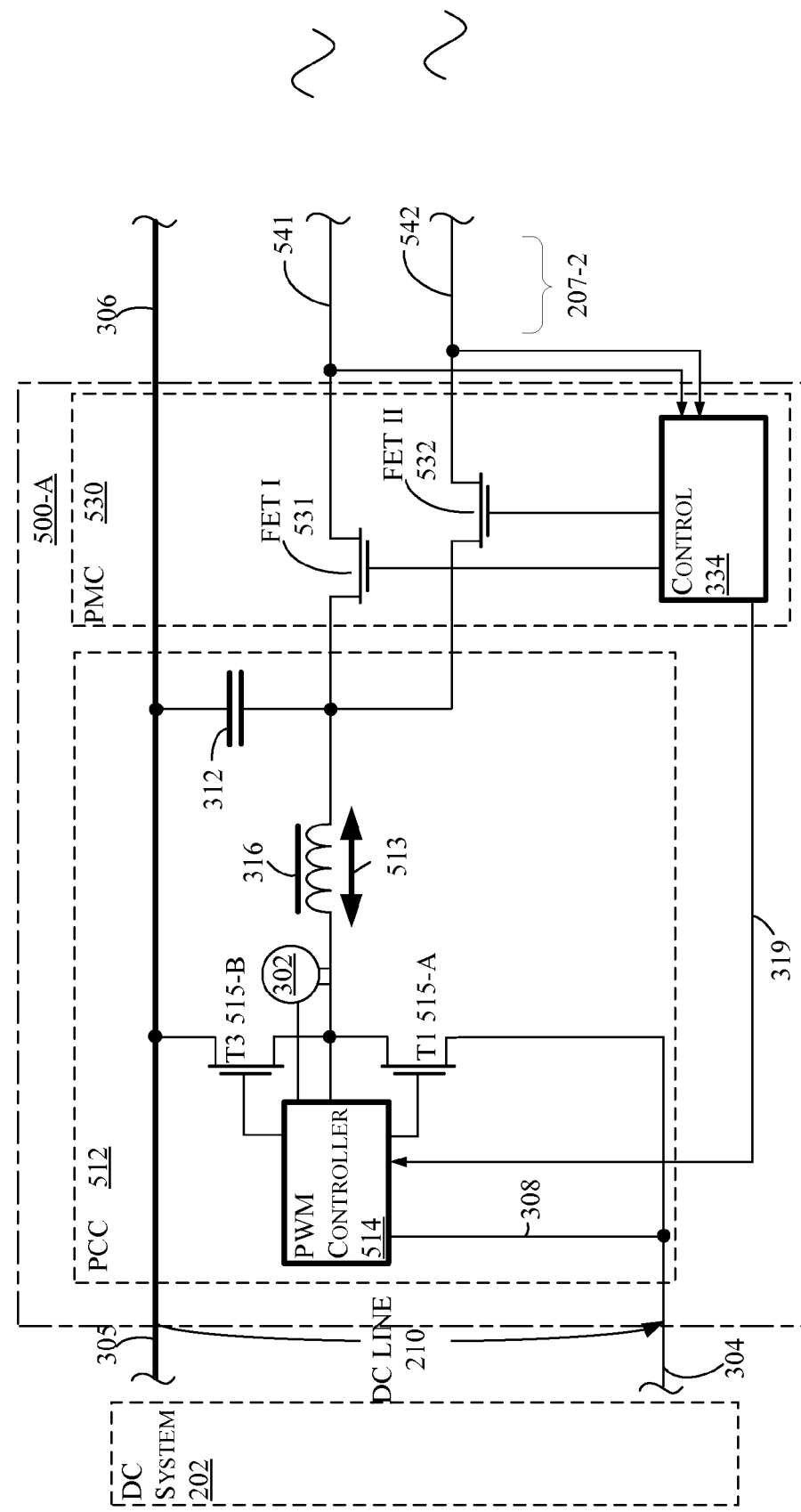
FIG. 5A is a schematic of a split single-phase AC system coupled via a selectable buck or boost DC-DC converter for bidirectionally transferring power between a DC line and an AC line via solid-state switches with bidirectional current carrying capability, according to one or more embodiments.

Referring now to FIG. 5A, a schematic is shown of a split single-phase AC system coupled via a selectable buck or boost DC-DC converter for bidirectionally transferring power between a DC line and an AC line via solid-state switches with bidirectional current carrying capability, according to one or more embodiments. System 500-A differs from all prior systems described in that power can be transferred bidirectionally, rather than just unidirectionally, as shown by bidirectional current flow 513 through inductor 316. Thus, system 500-A provides both an alternative energy DC power source to power an electrical, or utility, grid, as well as a DC system to receive power from the utility grid when the DC power source is down. Resultantly, a comprehensive power management system is provided for residential, commercial, and industrial applications.

System 500-A is configured with basic components whose properties and functions have been previously described, e.g., capacitor 318, inductor 316, PWM controller 314, etc. Furthermore, system 500-A utilizes block portions from prior systems, such as solid state switches with turn-off capability 531 and 532 in polarity-matching block 530, and DC voltage level of −190 VDC, both as previously described in system 400-A of FIG. 4A. However, power-conditioning block 512 is uniquely configured with multiple switching transistors to selectively accommodate a buck or boost DC-DC converter configuration, depending on the direction of current transfer. For example, a "buck" type DC-DC converter configuration bucks the −190 DCV to a VAC anywhere from 0 to −155 V peak when the alternative energy source DC power source generates sufficient power for the AC utility grid system. Complementarily, a "boost" type DC-DC converter configuration boosts the −155 VAC peak voltage from the utility AC system to the −190 V DC when the DC system demand exceeds the DC power source supply.

For example, when DC system 202 operates as a power sourcing function via DC line 210, then power conditioning circuit 512 is configured to operate as a "buck" type DC-DC converter, by: 1) controlling transistor T3 515-B, via PWM controller 514, to act as an synchronous rectifier, providing clamping similar to diode 309 of FIG. 4A; and 2) controlling transistor T1 515-A, via PWM controller 514, to act as a switching transistor for generating current through inductor 316 similar to T1 315 transistor of FIG. 4A. In contrast, when DC system 202 operates as a power sinking function, receiving power from AC line 207-2 via DC line 210, then power conditioning circuit 512 is configured to operate as a "boost" type DC-DC converter, by: 1) controlling transistor T3 515-B, via PWM controller 514, to act as a switching transistor for generating current through inductor 316 similar to T1 315 transistor of system 400-B of FIG. 3B; and 2) controlling transistor T1 515-A, via PWM controller 514, to act as an synchronous rectifier, e.g., a power FET, providing clamping similar to diode 309 of FIG. 4A. System 500-A can be configured for any quantity of phases, e.g., from a single phase up to three-phases.

A timing diagram for system 500-A would perform similarly to timing diagram 300-C of FIG. 3C when DC system acts as a power source, and would perform similarly when DC system acts as a power sink except that current profile would be moved below the axis to reflect the changed direction of current flow.

Figure 5B:
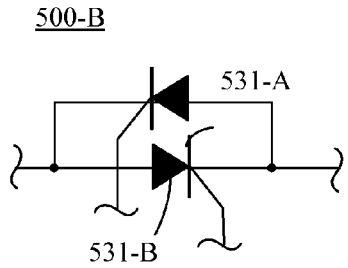
FIG. 5B is a bi-directional solid-state switch with turnoff capability only at zero current for bidirectionally transferring power between a DC line and an AC line, according to one or more embodiments.

Referring now to FIG. 5B, a bi-directional solid-state switch 500-B with turnoff capability only at zero current for bidirectionally transferring power between a DC line and an AC line is shown, according to one or more embodiments. Switch 500-B includes oppositely biased SCRs coupled in parallel to each other such that one SCR 531-A conducts current when DC circuit acts as a power source and another SCR 531-B conducts current when DC circuit acts as a power sink. Switch 500-B can be substituted for each of solid-state switches 531 and 532 in polarity-matching circuit 530 of FIG. 5A. However, a switching transistor circuit similar to 307 of FIG. 3B would be used in a two-phase AC system with overlapping phases in order to shunt current from SCR 500-B when changing the phase line conducting current such that a zero current condition through switch 500-B would allow the SCR to turn off.

Figure 5C:
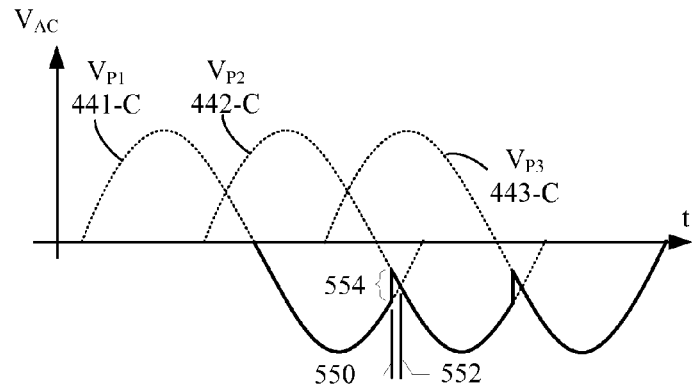
FIG. 5C is a timing diagram illustrating current stealing on a three-phase AC line using switches with turnoff capability only at zero current, according to one or more embodiments.

Referring now to FIG. 5C a timing diagram is shown that illustrates current stealing on a three-phase AC line using switches with turnoff capability only at zero current, according to one or more embodiments. The curves represent the phase voltages, with the dashed line above the axis being the voltage on the AC line for each respective phase, and the solid line below the axis being the voltage level on the common node 440 between inductor 316 and phase switches 461 to 463. While a given first switch is closed, e.g., solid state SCR switch 461 with turnoff capability only at zero current of FIG. 4C to communicate current $I_{P1}$ from the DC line 210 to phase 1 of the AC line 471, and at a voltage AC ($V_{AC}$) point 550 before reaching a crossover point 552 with another subsequent and adjacent phase, a second switch is closed, e.g., solid state SCR switch 462 with turnoff capability only at zero current to communicate current $I_{P2}$ from the DC line 210 to phase 2 of the AC line 472. When second switch 462 closes it reduces the voltage at the common node 440 of FIG. 4C as shown by voltage reduction 554 in FIG. 5C, thereby reverse biasing and opening first switch 461, and thereby stealing its current and preventing more than one phase from communicating to the DC line 304. For a multi-phase system greater than 3 phases, a phase may be skipped and the next phase might still overlap, and thereby allow use of current stealing for switching between phases. While the foregoing figures illustrated specific quantity of phases for a given topology, the architecture in each figure can be adapted to a different quantity of phases.

Flowcharts

Figure 6A:
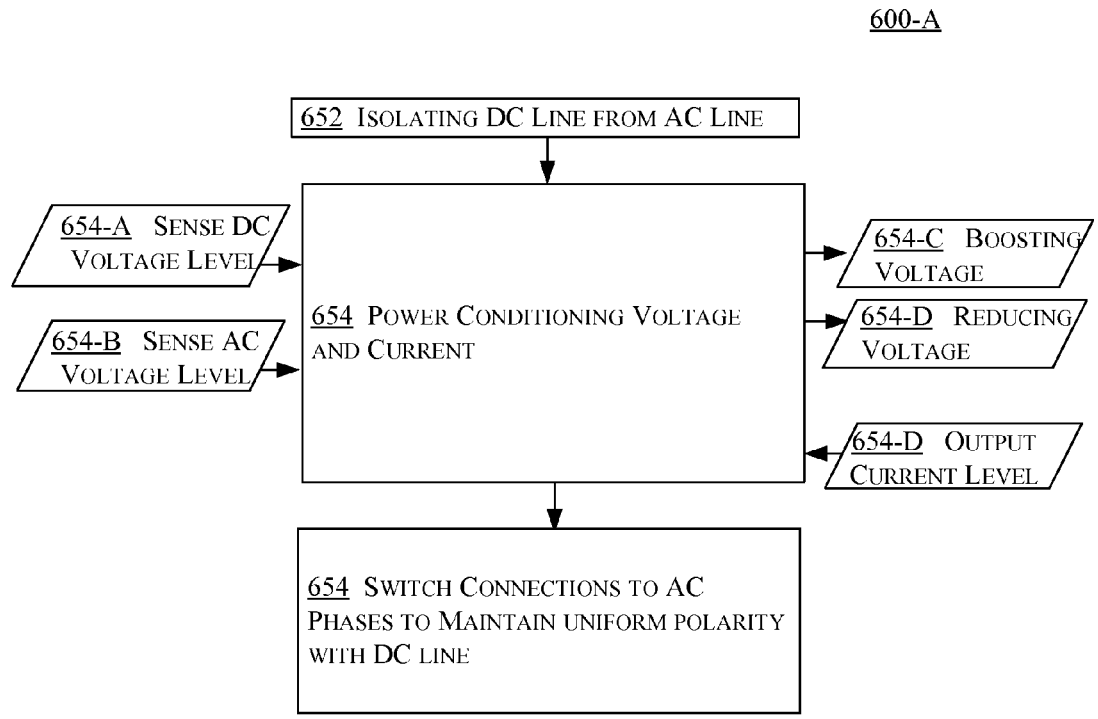
FIG. 6A is a flowchart of a process for isolating, power conditioning, and switching power that is transferred between a DC line and an AC line, according to one or more embodiments.

Referring now to FIG. 6A, a flowchart 600-A is shown of a process for isolating, power conditioning, and switching power between a DC line and an AC line, according to one or more embodiments. Flowchart 600-A begins with operation 652 of isolating DC line from AC line, as provided by isolation block 203 of FIG. 2 to prevent DC faults from interfering with the AC system. The isolation block may also include an operation of level shifting e.g. from the 190V DC used for easy 120VAC compatibility to 48V DC to avoid regulatory issues with wiring high voltage DC in buildings.

Power-condition operation 654 conditions the voltage and current received from either the DC system 202 to AC system 250 as a half-wave inverter, or from the AC system 250 to the DC system 202 as a half-wave rectifier, depending upon operating conditions and on the circuit configuration provided in prior FIG. 3A through FIG. 5A. Power-condition operation 654 conditions the voltage and/or current from the DC system 202 to AC system 250 if a sensed DC operating voltage input 654-A is above a threshold level, e.g., indicating that the DC power source has surplus power after meeting the existing DC loads. If, conversely, a sensed DC voltage level input 654-A is below a threshold level, then power-condition operation 654 is programmed to power-condition a voltage and current from AC system 250 to DC system 202, as DC power source is unable to meet existing DC loads. Power conditioning operation 654 utilizes a suboperation of boosting voltage 654-C using a boost DC-DC converter or a suboperation of bucking voltage 654-D using a buck DC-DC converter, depending on the voltage levels of a DC or AC system between which power is transferred. The DC-DC converters in PCC 512, 412-C, 412-A, and 312-B, 312-A, and 212 can be utilized to implement operation 654. Output current level 654-D is sensed to determine duty cycle of DC-DC converter, and to condition the current to one of multiple current profiles. A first current profile matches a shape of a voltage waveform of the AC line 250 with adjustments to compensate for clipping the current in order to open SSS that require zero current to open and to compensate for any power factor offsetting from DC loads, e.g., dimmer switch bias to the back half of a phase. A second current profile is an inverse of the voltage waveform of the AC line 250, to provide a constant power output to the AC line 250.

Figure 6B:
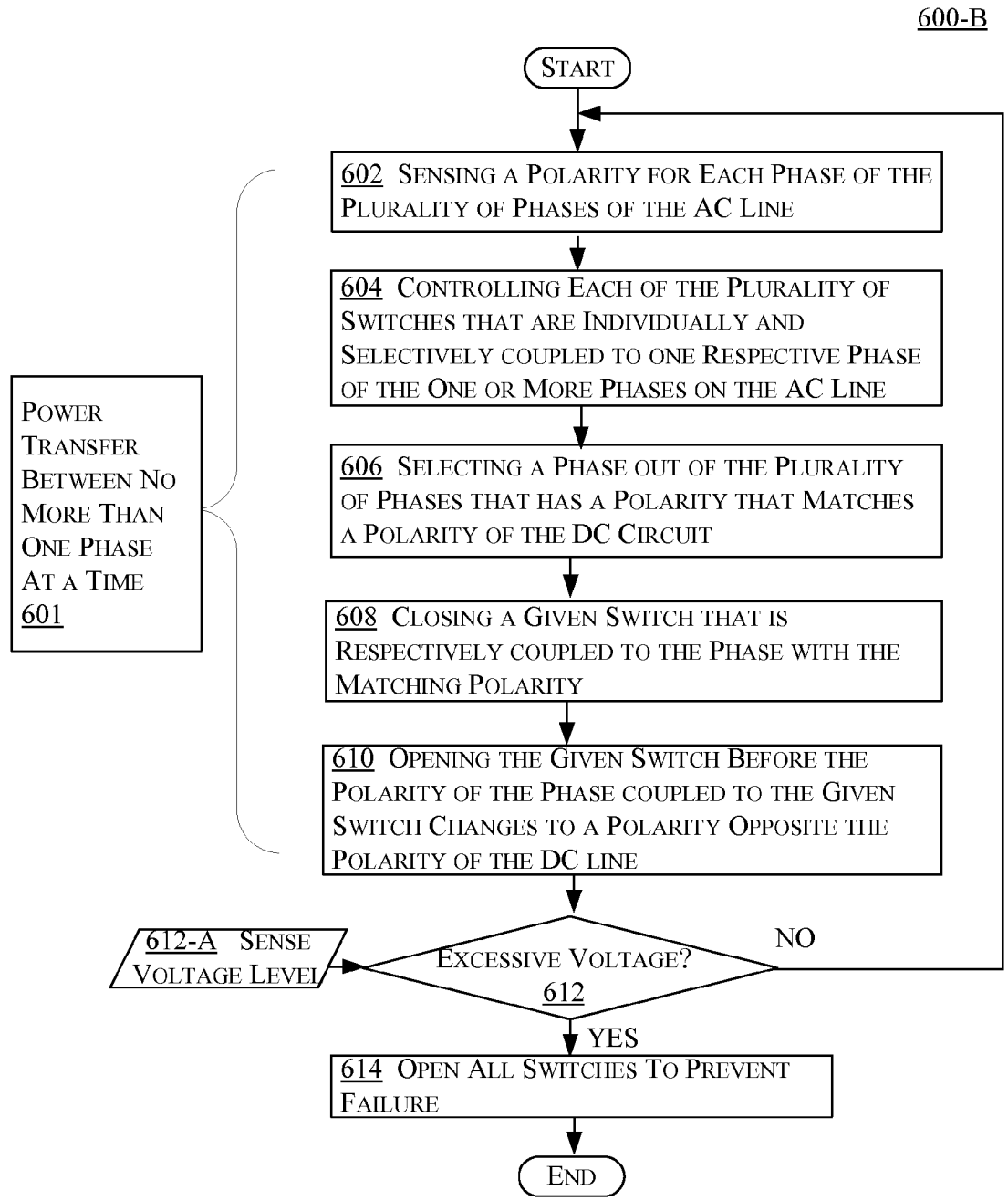
FIG. 6B is a flowchart of a process for selectively coupling a DC line to an AC line only when their respective polarities are the same, according to one or more embodiments.

Referring now to FIG. 6B, a flowchart 600-B is shown of a process for selectively coupling a DC line to an AC line when their respective polarities are the same, according to one or more embodiments. Operation 602 senses a polarity for each phase of the plurality of phases of the AC line. When a polarity of one AC phase line matches the polarity of the DC line it is a candidate for being coupled to the DC line. Operation 604 controls each of the plurality of switches that individually and selectively couple the DC line to one respective phase of the one or more phases on the AC line. Operation 606 selects a phase of the plurality of phases that has a polarity that matches a polarity of the DC line. Operation 608 closes a given switch that is respectively coupled to the phase with the matching polarity. Operation 610 opens a given switch transferring current before the polarity of the phase changes to a polarity opposite that of the DC line. If, during operations 606 through 610, two phases each have a polarity that match the polarity of the DC line at the same time, then a controller is configured to ensure that no more than one phase is fully coupled to the DC line at a time, e.g., no more than one switch is fully closed, and in one embodiment, both phase lines with matching polarity are switched off so that no phase is communicating with the DC line. A phase line with a rising voltage level from neutral will have priority for coupling to the DC line versus another phase line with a decreasing voltage level. In operation 612 an inquiry determines whether excessive voltage exists in the AC line, per sensed voltage input 612-A. An affirmative response will proceed to operation 614 that opens all switches to prevent a shorting failure between AC and DC systems, while a negative response returns to operation 602 for repeating the overall process herein.

Representative circuit 300 utilizes a negative (with respect to neutral) DC supply "−190 VDC" as shown such that an n-channel field effect transistor (FET) may be conveniently utilized for transistors, e.g., T1 315. It is appreciated that p-channel FETs can be similarly utilized with a positive DC supply. Additional devices such as snubbers, ancillary power supplies, fuses, etc. may be utilized in the present disclosure to provide smoother and more regulated power transfer. Such devices are well known in the art and are not shown for clarity. Furthermore, one skilled in the art" could combine the positive and negative versions of the circuit to get better utilization of the utility transformer. For example, one circuit handles positive polarity on any phase while the other circuit handles negative polarity on any phase, such that for a 2-phase system both phase and anti-phase are driven continuously. The DC supply can be common or separate—i.e. the DC power supply can be 380V.

Methods and operations described herein can be in different sequences than the exemplary ones described herein, e.g., in a different order. Thus, one or more additional new operations may be inserted within the existing operations or one or more operations may be abbreviated or eliminated, according to a given application.

Other features of the present embodiments will be apparent from the accompanying drawings and from the detailed description. In addition, it will be appreciated that the various operations, processes, and methods disclosed herein may be carried out, at least in part, by processors and electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to explain the principles of the invention and its practical application best and thereby to enable others skilled in the art to best utilize the invention and various embodiments with various modifications as are suited to the particular use contemplated. It should be appreciated that embodiments, as described herein, can be utilized or implemented alone or in combination with one another. While the present invention has been described in particular embodiments, it should be appreciated that the present invention should not be construed as limited by such embodiments, but rather construed according to the claims appended hereto and their equivalents.

I claim:

1. A circuit for transferring power between a direct current (DC) line and an alternating current (AC) line having one or more AC phases, the circuit comprising:
   a polarity-matching circuit comprising:
     one or more switches coupled to the DC line, wherein each of the one or more switches is individually coupled to one respective phase of the one or more AC phases on the AC line; and
     a phase-selector coupled to each of the one or more of switches; and wherein:
       the phase-selector is configured to control the one or more switches such that no more than one switch is closed when power is being transferred between the AC line and the DC line; and wherein:
   a current communicated between the DC line and the AC line is unidirectional.

2. The circuit of claim 1 wherein:
   the phase selector is configured to couple each of the one or more switches selectively to the AC line such that no more than half of each phase, for all the one or more phases on the AC line, is communicated to the DC line.

3. The circuit of claim 1 wherein:
   the phase selector is configured to couple each of the one or more switches selectively to the AC line such that only one polarity of each phase for all the phases on the AC line is communicated to the DC line.

4. The circuit of claim 1 wherein:
   the circuit is configured as a half-wave rectifier when a DC power source powers the DC line and the DC line transfers power to the AC line; and the circuit is configured as a half-wave inverter when the DC power source does not power the DC line and when the AC line provides power to the DC line.

5. The circuit of claim 1 wherein:
   each of the one or more switches comprises:
     a quantity of switches not greater than a quantity of phases supplied by the AC line.

6. The circuit of claim 1 wherein:
   the phase-selector is coupled to:
     each of the one or more switches for configuring an open or closed state in each of the one or more switches; and
     an output from each of the one or more switches for shutting down all of the one or more switches when an output voltage from any one of the one or more switches exceeds a threshold voltage level; and wherein:
       a closed switch in the polarity matching circuit to one phase is opened reverse biasing the closed switch and then turning off the closed switch.

7. The circuit of claim 1 wherein:
   the phase-selector is configured to open a given switch of the one or more switches before:
     a polarity of an AC phase to which the given switch is coupled changes to a polarity that is opposite of a polarity of the DC line; or
     a zero voltage level is reached by the AC phase to which the given switch is coupled.

8. The circuit of claim 7 wherein:
   the phase-selector is configured to initiate closing a second switch coupled to a second phase, at a same time that a first switch coupled to a first phase is already closed.

9. The circuit of claim 1 wherein:
   each of the one or more switches is:
     a power field effect transistor (FET) that can communicate current for both polarities of the AC current;
     a silicon-controlled rectifier (SCR);
     a pair of oppositely oriented SCRs coupled to the DC line and to one phase of the AC line, wherein a first SCR of the pair is oriented to communicate current from the DC line to the AC line, and a second SCR of the pair is oriented to communicate current from the AC line to the DC line;
     a triac; or
     an insulated gate bipolar transistor (IGBT).

10. The circuit of claim 9 wherein:
   each of the one or more switches is designed to operate at a peak-to-peak voltage of the AC line and at a frequency that does not exceed a frequency of the AC line.

11. The circuit of claim 9 wherein:
   the SCR or triac is opened in order to deselect a phase by reverse biasing the SCR or the triac or by reducing the current through the switch to zero.

12. The circuit of claim 1 further comprising:
   a power-conditioning circuit coupled to the DC line and to the polarity-matching circuit; and
     wherein the power-conditioning circuit is configured to transfer power between the DC line and AC line only when a polarity of the AC line is the same as a polarity of the DC line.

13. The circuit of claim 12 wherein:
   the power-conditioning circuit is configured as a buck converter if an operating voltage of the DC line is at a higher voltage than a peak voltage of the AC line; or the power-conditioning circuit is configured as a boost converter if the operating voltage of the DC line is at a lower voltage than a peak voltage of the AC line.

14. The circuit of claim 12 wherein:
the power-conditioning circuit comprises:
  a pulse-width modulated (PWM) transistor coupled to each of the one more switches in the polarity-matching circuit and coupled to a neutral side of the AC line, the PWM transistor for driving current from the DC line into the AC line; and
  a pulse width modulated (PWM)-controller coupled to a gate of the PWM transistor, wherein the PWM controller is configured to switch the PWM transistor at a duty-cycle to obtain a desired current on the DC line.

15. The circuit of claim 14 wherein:
the PWM transistor and each of the one or more switches in the circuit for either a buck converter or a boost converter are exposed to a voltage on the DC line that is less than the peak voltage of the AC line.

16. The circuit of claim 15 wherein:
the PWM transistor operates at a voltage that is lower than a voltage at which the one or more switches in the polarity-matching circuit operate; or
the PWM transistor operates at a frequency that is higher than a frequency at which the one or more switches in the polarity-matching circuit operate.

17. The circuit of claim 14 further comprising:
a current sensor disposed on an output of the power-conditioning circuit and coupled to the PWM controller to provide a feedback that is used to configure the PWM controller to drive a desired current profile onto the AC line.

18. The circuit of claim 17 wherein:
the PWM controller is configured to generate a current profile that matches a voltage profile of a phase of the AC line to which the power-conditioning circuit is presently driving current.

19. The circuit of claim 17 further comprising:
a second current sensor disposed between a DC power source and the power-conditioning circuit, the second current sensor configured to provide a feedback to the PWM controller to configure the PWM controller to drive a desired current profile onto the AC line having three-phases.

20. The circuit of claim 19 wherein:
the power conditioning circuit is configured to output a constant output power to the AC line by passing all input power from the DC power source out to the AC line.

21. The circuit of claim 19 wherein:
the current profile is approximately equal to an inverse of the voltage profile;
the voltage profile is a sine wave; and
the resultant instantaneous output power is approximately constant as a product of the current profile times the voltage profile.

22. The circuit of claim 14 wherein:
the power conditioning circuit further comprises:
  a flyback diode coupled to the PWM transistor and to a high side of the DC line to catch the flyback current if the circuit is configured solely as an inverter; or
  a synchronous rectifier coupled to the PWM transistor and to the high side of the DC line to catch flyback current if the circuit is operating as an inverter, and to operate as a buck PWM transistor if the circuit is operating as a rectifier.

23. The circuit of claim 22 wherein:
the power conditioning circuit senses a voltage on the DC line; and
the power conditioning circuit is configured to drive current to the AC line if the voltage on the DC line is above a threshold voltage.

24. The circuit of claim 22 further comprising:
a shunt coupled between neutral and a common node for the plurality of switches, the shunt for bypassing current from the plurality of switches that can only open with zero current in order to force the plurality of switches to open.

25. The circuit of claim 1 wherein:
a given phase on the AC line is coupled to the circuit by a minimum of one switch.

26. The circuit of claim 1 wherein:
the circuit drives only a single polarity of the one or more phases on the AC line, with respect to the neutral of the AC line.

27. The circuit of claim 1 wherein:
the DC line is selectively coupled to an AC phase when the AC phase has a polarity that matches a polarity of the DC line.

28. The circuit of claim 1 wherein:
the circuit drives each of the phases in turn against a neutral of the AC line.

29. The circuit of claim 1 wherein:
the circuit only drives a unidirectional current into each of the one or more phases of the AC line.

30. The circuit of claim 1 wherein:
the DC line is coupled to a neutral of the AC line.

31. The circuit of claim 1 wherein:
throughout the circuit, the polarity is fixed.

32. A method of transferring power between a direct current (DC) line having a plurality of switches and an alternating current (AC) line having a plurality of phases, the method comprising:
sensing a polarity of the DC line as a fixed polarity;
sensing a polarity, via a polarity-matching circuit, of the plurality of phases of the AC line;
selectively closing one of the plurality of switches mated to a single phase of the plurality of phases of the AC line when the polarity of the DC line is the same as the polarity of the single phase to which the switch is mated; and
selectively opening the one of the plurality of switches that is coupling the DC line to the AC line before the polarity of the single phase to which the switch is mated changes to a polarity that is the opposite of the polarity of the DC line; and wherein:
a current communicated between the DC line and the AC line is unidirectional.

33. The method of claim 32 wherein:
a current communicated between the DC line and the AC line occurs only on one-half of a full-cycle waveform for each of the plurality of phases to create a half-wave inverter if current flows from the DC line to the AC line, or a half wave rectifier if current flows from the AC line to the DC line; and
the circuit drives each of the phases in turn against a neutral of the AC line.

34. The method of claim 33 further comprising:
boosting a voltage level of the DC line using a boost DC-DC converter to power a voltage level of the AC line that is no lower than the voltage level of the DC line;

reducing the voltage level of the DC line using a buck DC-DC converter to power a voltage level of the AC line that is no higher than the voltage level of the DC line; or selectively boosting and bucking the voltage level using a combination of the boost and buck DC-DC converter to power an entire range of the voltage level of the AC line.

35. The method of claim 34 further comprising:

selecting a half-wave inverter or a half-wave rectifier to communicate current between the DC line and the AC line depending upon the voltage of the DC line and the voltage of the AC line.

36. The method of claim 32 wherein:

the plurality of phases of the AC line is either a split single phase having a phase and an antiphase component, or is a multi-phase having two or more individual phases.

37. The method of claim 32 wherein:

the selective closing of one of the plurality of switches occurs at an active voltage level on the AC line; and the active voltage level is a threshold voltage at which the electrical grid is safely active.

38. The method of claim 32 wherein:

power is transferred between the DC line and no more than one of the plurality of phases of the AC line at a time; and throughout the circuit, the polarity is fixed.

39. The method of claim 38 wherein:

the plurality of phases is a phase and an antiphase for a split single phase on the AC line;

the DC line drives the phase and the antiphase only for one half of each of their plurality of phases; and the AC line drives a full sine wave to an electrical grid coupled to the AC line.

40. The method of claim 32 further comprising:

sensing a voltage level on a given switch that is currently conducting power between the DC line and the AC line; and turning off the given switch to prevent a failure when a voltage level output from the given switch exceeds a predetermined threshold level.

41. The method of claim 32 further comprising:

receiving power from a DC power source; and isolating the power received from the DC power source prior to transferring it to the AC line.

42. The method of claim 41 wherein:

the DC power source is an alternative energy power source selected from a group of power sources consisting of: wind power, hydropower, thermal power, and solar power.

43. The method of claim 32 further comprising:

repeating the sensing operation for each of the plurality of phases;

repeating in a sequential manner the operation of selectively closing each of the plurality of switches that is respectively coupled to one of the plurality of phases when the polarity of the DC line matches a polarity of one of the plurality of phases; and repeating in a sequential manner the operation of selectively opening each of the plurality of switches that is respectively coupled to one of the plurality of phases, before the polarity of one of the plurality of phases coupled to the DC line changes to a polarity that is the opposite of the polarity of the DC line; and wherein no more than one of the plurality of switches that is coupling the DC line to the AC line is fully closed at any point in time.

44. The method of claim 43 further comprising:

modulating a PWM transistor coupled to the DC line to drive current.

45. The method of claim 44 further comprising:

modulating a DC-to-DC converter to generate an output current on the DC line with a waveform that is approximately the same shape with a waveform of a voltage level of the AC line.

46. The method of claim 44 further comprising:

opening all the plurality of switches for a period of time so as not to conduct current from the DC line to the AC line, thereby guaranteeing that the DC line will not be conducting with two or more phases of the AC line at the same time.

47. The method of claim 46 further comprising;

turning off a current on the DC line immediately prior to a time when a given phase voltage crosses zero such that no current is supplied to any of the plurality of switches coupled to the AC line; and forcing the plurality of switches to reach or maintain an open state for a period of time.

48. The method of claim 47 further comprising:

turning off a pulse-width modulated transistor to eliminate current flow to the switches such that all the plurality of switches will be forced open.

49. The method of claim 47 further comprising:

shunting current from one of the plurality of switches that is communicating current to an AC phase to force open the one of the plurality of switches; and wherein the shunting operation occurs before the polarity of the AC phase changes to a polarity that is opposite the polarity of the DC line.

50. The method of claim 46 further comprising:

selectively decoupling a given phase from the DC line; and selectively coupling a phase that is adjacent and subsequent to the given phase to the DC line when the adjacent subsequent phase is crossing zero volts into a polarity that is the same as the polarity of the DC line.

51. The method of claim 46 further comprising;

opening a switch coupling the DC and the AC line while current is still flowing through the switch.

52. The method of claim 44 further comprising:

after a given phase that was coupled to the DC line is decoupled, bypassing at least one subsequent phase having the same polarity as the DC line from being coupled to the DC line.

53. The method of claim 52 wherein:

the at least one subsequent phase bypassed is a quantity of phases that results in a balance among all the plurality of phases over time.

54. The method of claim 53 further comprising:

closing a first switch coupled to the given phase when the given phase is at an active voltage level;

conducting current between the DC line to the AC line;

opening the first switch at approximately a zero voltage;

bypassing a second switch coupled to a second phase, wherein the second phase is immediately following the given phase in order to ensure no overlap between coupling the DC line to the given phase and the second phase;

closing a third switch coupled to a third phase at the active voltage level; and conducting current between the DC line and the AC line.

55. The method of claim 52 wherein a cumulative phase current for each of the phases on the AC line is approximately equal over a plurality of cycles.

56. The method of claim 52 wherein:
the at least one subsequent phase bypassed is a quantity of phases not equal to one minus a total quantity of all the AC phases and is not a divisor to the total quantity of AC phases that would result in a whole number quotient.

57. The method of claim 52 wherein:
one of the one or more subsequent phases bypassed is adjacent to the given phase.

58. The method of claim 44 further comprising:
maintaining a voltage level on the DC line that is approximately constant; and
modulating a duty cycle of the switching transistor via a PWM controller in the power conditioning circuit such that a current drawn on the DC line from a DC power source is approximately constant, thereby resulting in a constant power drawn from a DC power supply by the power conditioning circuit.

59. The method of claim 58 further comprising:
generating a current from the power conditioning circuit to the AC line at the voltage level of the AC phase presently being powered by the power conditioning circuit.

60. The method of claim 58 wherein:
at least two of the plurality of switches can be in a transition state between open to closed at approximately the same time for a multi-phase AC cycle; and
only one of the plurality of switches is in a fully closed state at any given time.

61. The method of claim 60 wherein:
a first switch and a second switch of the plurality of switches are each a solid-state switch capable of opening while carrying current; and
the second switch is closing at approximately the same time the first switch is opening and at a time prior to the phases respectively coupled to the first switch and the second switch change polarity to a state opposite the polarity of the DC line.

62. The method of claim 60 wherein:
the first switch is opening and the second switch is closing at approximately the crossover voltage point for a first phase and a second phase where the voltage of the first phase and the voltage of the second phase are approximately equal.

63. The method of claim 60 further comprising:
closing a first switch coupled to a first phase; and
closing a second switch coupled to a second phase; and wherein:
the second switch is closed at the same time the first switch is closed in order for the second switch to steal current from the first switch and force the first switch to open.

64. The method of claim 63 wherein:
the closing of the second switch occurs as the second phase increases from a zero voltage; and
the opening of the first switch occurs as the first phase approaches a zero voltage.

65. The method of claim 60 wherein:
the first and second switch are solid state switches only capable of opening while driving approximately zero current; and
the first switch opens prior to a first phase reaching a zero voltage.

66. The method of claim 60 wherein:
a first phase and a second phase both have the same polarity as the polarity of the DC line; and
the second phase has a potential to the neutral that is lower than a potential of the first phase to neutral.

67. The method of claim 58 further comprising:
generating a constant power output from the power conditioning circuit to the AC line by maintaining a constant power input to the power conditioning circuit.

68. A system for transferring power between a direct current (DC) line and an alternating current (AC) line, the system comprising:
an isolation circuit;
a DC/AC interface coupled to the isolation circuit, the DC/AC interface comprising:
a power-conditioning circuit coupled to the DC line;
a polarity-matching circuit coupled to the power-conditioning circuit and to the AC line; and wherein:
a current communicated between the DC line and the AC line is unidirectional;
the polarity-matching circuit comprises:
one or more switches coupled to the DC line, wherein each of the one or more switches is individually coupled to one respective phase of one or more AC phases on the AC line; and
a phase-selector coupled to each of the one or more of switches; and wherein:
the phase-selector is configured to control the one or more switches such that no more than one switch is closed when power is transferred between the AC line and the DC line.

69. The system of claim 68 further comprising:
a DC power source coupled to the isolation circuit, the DC power source chosen from a group of power sources consisting of: a photovoltaic (PV) DC power source, a wind-powered DC power source, and an alternative energy DC power source.

70. The system of claim 68 wherein:
the power conditioning circuit further comprises:
one or more AC loads disposed between the DC/AC interface and an AC system; and
a current sensor disposed between the one or more loads and the AC system; and
wherein:
the current sensor is coupled to a PWM controller in the power conditioning circuit to provide a feedback used to configure the PWM controller to shape a current generated in the power-conditioning circuit to maximize a power factor (PF) at the current sensor.

71. The system of claim 70 wherein:
the DC/AC interface is configured to be bidirectional to convert DC to AC if a DC power source has sufficient power to meet a DC load on the DC line, and to convert AC to DC if the DC power source has insufficient power to the DC load coupled to the DC line.

72. The system of claim 70 further comprising:
a mechanical energy storage device coupled between the DC/AC interface and the AC loads.

73. The system of claim 72 wherein:
the mechanical energy storage device is a synchronous motor/generator (SMG) that is configured to receive power on multiple phases of a motor winding of the SMG and is configured to output a single phase from a generator winding of the SMG to the one or more AC systems.

* * * * *